(12) United States Patent
Aoki et al.

(10) Patent No.: US 6,744,841 B1
(45) Date of Patent: Jun. 1, 2004

(54) METHOD FOR CARRYING EQUIPMENT OUT OF NUCLEAR POWER PLANT

(75) Inventors: Masataka Aoki, Tokyo (JP); Takahiro Adachi, Tokyo (JP); Katsumi Kobayashi, Tokyo (JP); Mitsuo Kuroha, Tokyo (JP); Kazunori Izumi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/914,646
(22) PCT Filed: Sep. 29, 1999
(86) PCT No.: PCT/JP99/05333
§ 371 (c)(1), (2), (4) Date: Dec. 19, 2001
(87) PCT Pub. No.: WO01/24199
PCT Pub. Date: Apr. 5, 2001

(51) Int. Cl.⁷ ................................................. G21C 19/32
(52) U.S. Cl. .................... 376/260; 376/262; 376/272
(58) Field of Search ................................ 376/260, 262, 376/272

(56) References Cited

U.S. PATENT DOCUMENTS

| | | | | |
|---|---|---|---|---|
| 4,134,789 A | * | 1/1979 | Aubert | 376/233 |
| 4,769,207 A | * | 9/1988 | Weber et al. | 138/89 |
| 4,779,940 A | * | 10/1988 | Ralston | 312/241 |
| 4,847,038 A | * | 7/1989 | Martin | 122/DIG. 11 |
| 4,859,404 A | * | 8/1989 | Richard | 376/262 |
| 5,263,062 A | * | 11/1993 | Guigon et al. | 376/261 |
| 5,425,545 A | * | 6/1995 | McCusker | 280/30 |
| 5,901,752 A | * | 5/1999 | Lundman | 138/89 |
| 5,970,109 A | * | 10/1999 | Meier-Hynek et al. | 376/260 |

FOREIGN PATENT DOCUMENTS

| | | | | |
|---|---|---|---|---|
| JP | 10-39076 | | 2/1989 | |
| JP | 6-102398 | | 4/1994 | |
| JP | 6-230188 | | 8/1994 | |
| JP | 8-62368 | | 3/1996 | |
| JP | 8-240693 | | 9/1996 | |
| JP | 08-262190 | * | 10/1996 | 376/260 |
| JP | 8-285982 | | 11/1996 | |
| JP | 08-285997 A | * | 11/1996 | 376/260 |
| JP | 9-145882 | | 6/1997 | |
| JP | 9-297197 | | 11/1997 | |
| JP | 10-132985 A | * | 5/1998 | 376/260 |
| JP | 11-311693 | | 11/1999 | |

OTHER PUBLICATIONS

US Code of Federal Regulations, Title 10 Part 61, Dec. 1982, Section 61.56 (b) (3), p. 34 of 43.*

* cited by examiner

Primary Examiner—Michael J. Carone
Assistant Examiner—Daniel Matz
(74) Attorney, Agent, or Firm—Crowell & Moring LLP

(57) ABSTRACT

A method of carrying equipment out of a nuclear reactor building that, in carrying equipment rendered radioactive out of a nuclear reactor building, makes it possible to shorten the operating time and reduce the number of casks to be used, wherein the structures of a nuclear power plant that are outside the equipment installed in the nuclear power plant are removed and these removed structures are then stored in the space in the equipment and carried out of the building.

28 Claims, 27 Drawing Sheets

METHOD FOR CARRYING EQUIPMENT OUT OF NUCLEAR POWER PLANT

TECHNICAL FIELD

The present invention relates to a method for carrying out the equipment of a nuclear power plant from its containment building, more particularly to a method for carrying out the exposed equipment of a nuclear power plant from its containment building.

BACKGROUND ART

A first background art technique related to a method for carrying out a reactor pressure vessel (hereafter, to be referred to as an RPV), which is one of the exposed equipment, from its containment building is disclosed in Japanese Published Unexamined Patent Application No.6-230188. According to this method, the RPV is lifted up in an air lock prepared on the roof of the containment building, then the air lock is kept in a negative pressure state while both of the air lock and the RPV are moved together.

A second background art technique related to a method for carrying the RPV out is disclosed in the official gazette of Unexamined Published Japanese Patent Application No.8-62368. According to this method, at first a clean room is prepared for covering an opening of the roof of the containment building so as to be adjacent to the building, then the structures in the reactor, the control rod driver housing (hereafter, to be referred to as a CRD housing) and the RPV are united into one so as to be moved together in the clean room, then carried out from the building. The official gazette also describes another method for moving the structures in the reactor, the CRD housing, the RPV, and the γ shield that are united into one in the clean room, then carried out from the building.

A third technique related to a method for carrying the RPV out is disclosed in Japanese Published Unexamined Patent Application No.9-145882. According to this method, the structures in the reactor and the CRD housing are lifted up together with the RPV, then their outer surfaces are covered by a cylindrical shield respectively so as to be sealed as a large block. Then, the block is carried out from the containment building.

Although a method for carrying such an RPV out is described in the first to third background art techniques, neither a procedure nor a method for cutting off such structures as pipes connected to the RPV and none of the methods for carrying out and storing those cut-off structures is described in those techniques.

DISCLOSURE OF THE INVENTION

Under the circumstances, it is an object of the present invention to provide a method that can shorten a working time for carrying out structures disposed outside of the object nuclear power plant equipment and removed so as to carry out the equipment itself.

In order to achieve the above object, the present invention provides an embodiment. The embodiment removes structures of the object nuclear power plant, which is disposed outside the equipment of the plant first, then places those structures removed and covered by a shield respectively in spaces in the equipment, and finally carries out the equipment together with those structures therein out of the containment building.

According to the present invention, therefore, it is possible to place the structures removed from the nuclear power plant in the equipment to be removed and carried out of the containment building, thereby carrying out the equipment together with the structures placed therein from the containment building. Consequently, it is possible to shorten the working time required for carrying out the structures removed from the nuclear power plant so as to remove the equipment significantly. In addition, because those removed structures are placed in the equipment before they are carried out, it is possible to reduce the number of casks used for carrying out these structures.

Furthermore, in order to achieve the above object, the present invention provides another embodiment. The embodiment removes the structures disposed outside the equipment of the object nuclear power plant first, places those removed structures in the equipment, then removes and carries out the equipment covered by a shield out of the containment building.

In order to achieve the above object, the present invention provides further another embodiment. In this embodiment, the structures disposed outside the equipment of the object nuclear power plant are removed first, then they are placed in the equipment. After that, the equipment covered by shield and loaded with the removed structures therein is carried out from the containment building.

In order to achieve the above object, the present invention provides further another embodiment. In the embodiment, the joint of each connection between the reactor pressure vessel and a pipe is plugged while water is filled in the reactor pressure vessel above the joint, then the pipe is cut off outside the reactor pressure vessel and a closing plate is attached to the cut-off portion.

Consequently, the radioactive rays can be shielded by the filled water, so it is possible to protect the workers who cut off the pipes from the exposure more effectively.

BEST MODE FOR CARRYING OUT THE INVENTION

Figure 1A:
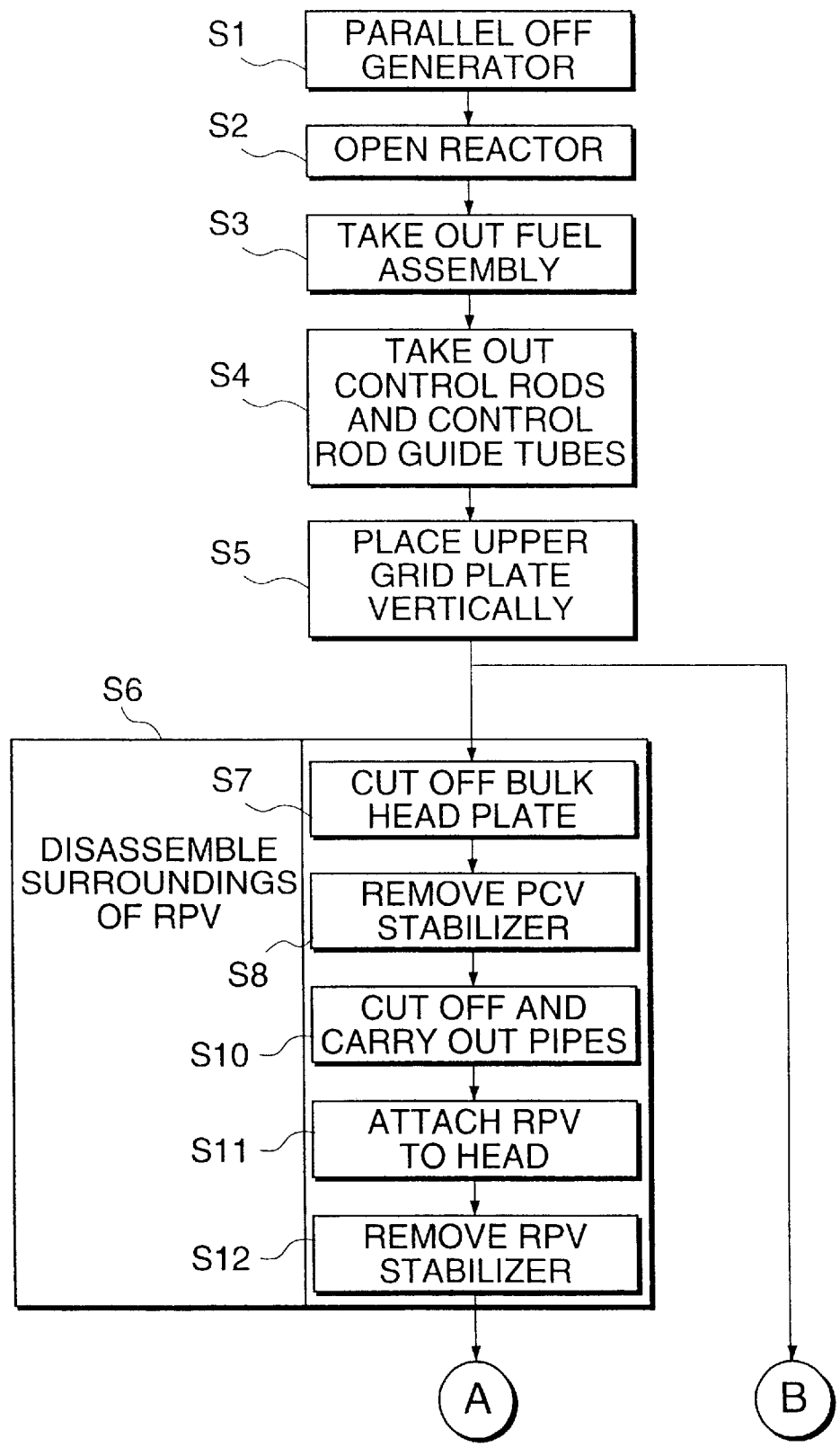
FIG. 1(a) is a flowchart of a procedure for carrying out object items in the first embodiment of the present invention.

An RPV is a huge apparatus, which comes to be about 25 m in height, about 6 m in diameter, and about 1000 tons in weight. The RPV is provided with a main steam outlet nozzle, a feedwater nozzle, etc., as well as 50 to 60 nozzles. A pipe is connected to each of those nozzles. When carrying out such an RPV from its containment building, therefore, pipes connected to those nozzles and steel structures disposed outside the RPV must be cut off and removed. Because the RPV has been exposed to radiation, those pipes must be cut off and removed in a highly radiation-exposed area. To avoid being exposed to radiation, therefore, measures must be taken for protecting the work from such radiation.

Furthermore, in addition to those pipes, such structures as a fuel change bellows, a bulk head plate, etc. are connected to the RPV. To carry the RPV out from the containment building, therefore, those structures must also be cut off and removed. The total weight of those structures will become about 100 tons. Because those structures also include radioactive substances, they must be housed in containers (hereafter, to be referred to as casks) that can shield radioactive rays during the work for carrying out those structures from the containment building. To put those structures in casks, it is also required that those structures are cut off in accordance with the sizes of the casks. The load of such a work will become enormous. In addition, casks are expensive, since they are required to shield radioactive rays. This is why the background art method has confronted with a problem that many expensive casks have been required for housing those removed structures.

Furthermore, because the surfaces of those casks must be inspected for contamination before the casks are handled in which structures are housed and before each cask is transported and stored independently, the work will also become enormous in load. Consequently, the background art has been confronted with another problem that the work period becomes long.

Furthermore, a pressurized water reactor has confronted with such problems when not only the containment vessel, but also the steam generator are carried out from the containment building.

Hereunder, the embodiments of the present invention will be described with reference to the accompanying drawings.

[First Embodiment]

At first, a description will be made for a method for carrying out the equipment of a nuclear power plant in the first embodiment of the present invention. In this embodiment, the present invention applies to a method for carrying out the RPV of a boiling-water reactor (hereafter, to be referred to as a BWR). According to this embodiment, at first pipes connected to the nozzles of the RPV are cut off sequentially from top to bottom thereof while the water level in the reactor is lowered step by step. Then, the upper lattice plate is removed and placed vertically on the upper flange of the shroud in the reactor. After that, wastes are carried into the shroud through a gap between the RPV and the upper lattice plate, then the upper lattice plate is returned to its horizontal position on the top surface of the shroud. Then, other wastes are piled on each another on the upper lattice plate, so that the RPV are carried out together with those wastes from the containment building and stored in a storage. The wastes in the shroud are also carried out at this time, of course.

Figure 2:
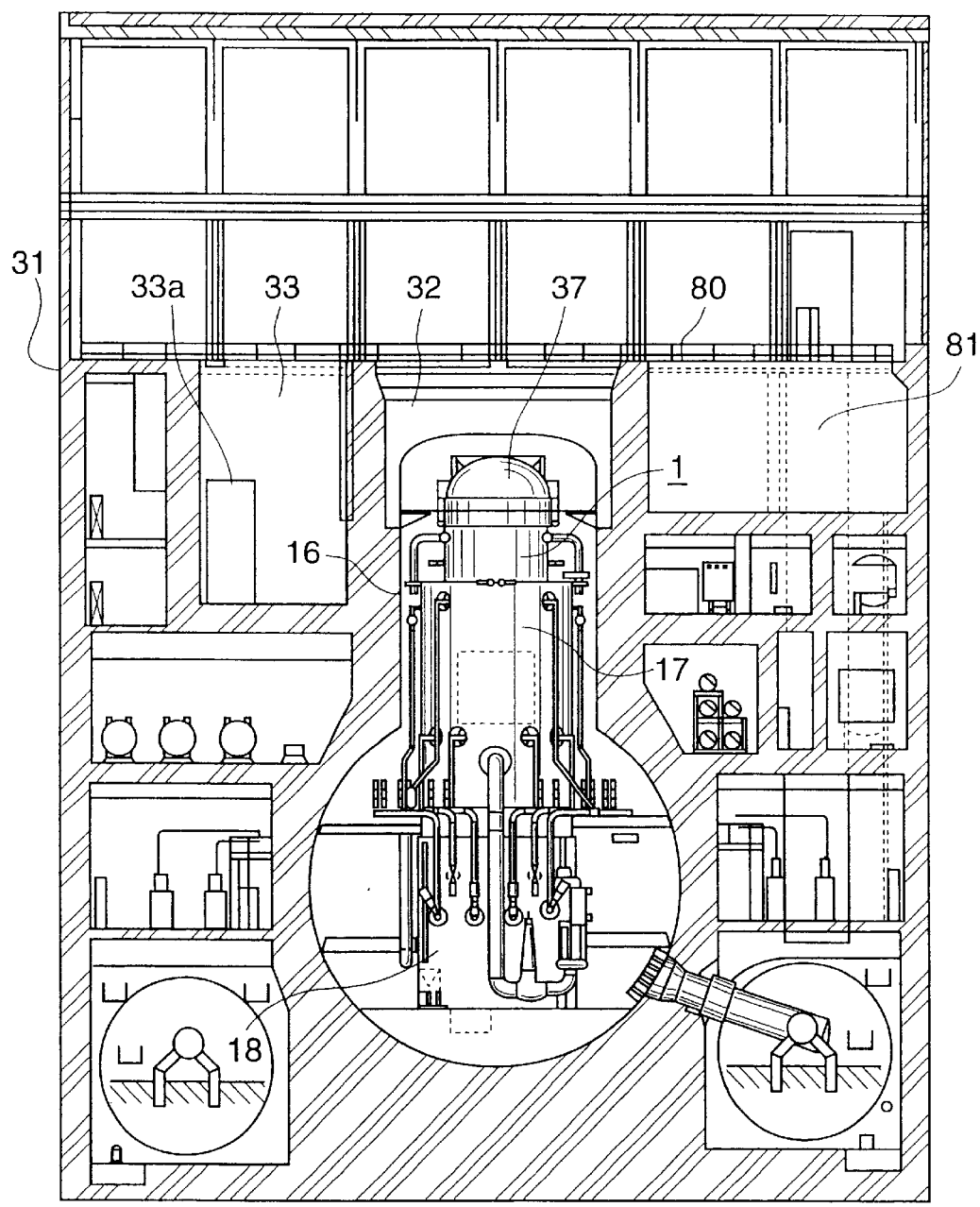
FIG. 2 is a cross sectional view of a containment building in the first embodiment of the present invention.

FIG. 2 shows a schematic vertical cross sectional view of a BWR-4 containment building to which the carry-out procedure shown in FIG. 1(a) is applied in this first embodiment. In the containment building 31 is disposed an RPV 1. An incore structure 2 is housed in the RPV 1. In the containment building 31 are housed a PCV 16 in the lower part of an operation floor 80 and in the PCV 16 is housed an RPV 1. The RPV 1 is disposed on an RPV pedestal 18 disposed inside the PCV 16. Outside the RPV 1 is disposed a reactor shielding wall 17 (hereafter, to be referred to an RSW) used to shield the radioactive rays from the RPV 1. In the upper part of the PCV 16 are disposed a reactor well 32 for pooling water when the fuel assembly is replaced with another and/or structures inside the RPV 1 are taken out; a spent fuel pool 33 for storing spent fuel assemblies; an equipment pool 81 for placing such incore-structures as a steam drier removed for periodical inspection, etc. Inside the spent fuel pool 33 is disposed a fuel rack 33a for storing spent fuel assemblies. On top of the RPV 1 is disposed a reactor pressure vessel head 37 (hereafter, to be referred to as an RPV head).

Figure 3:
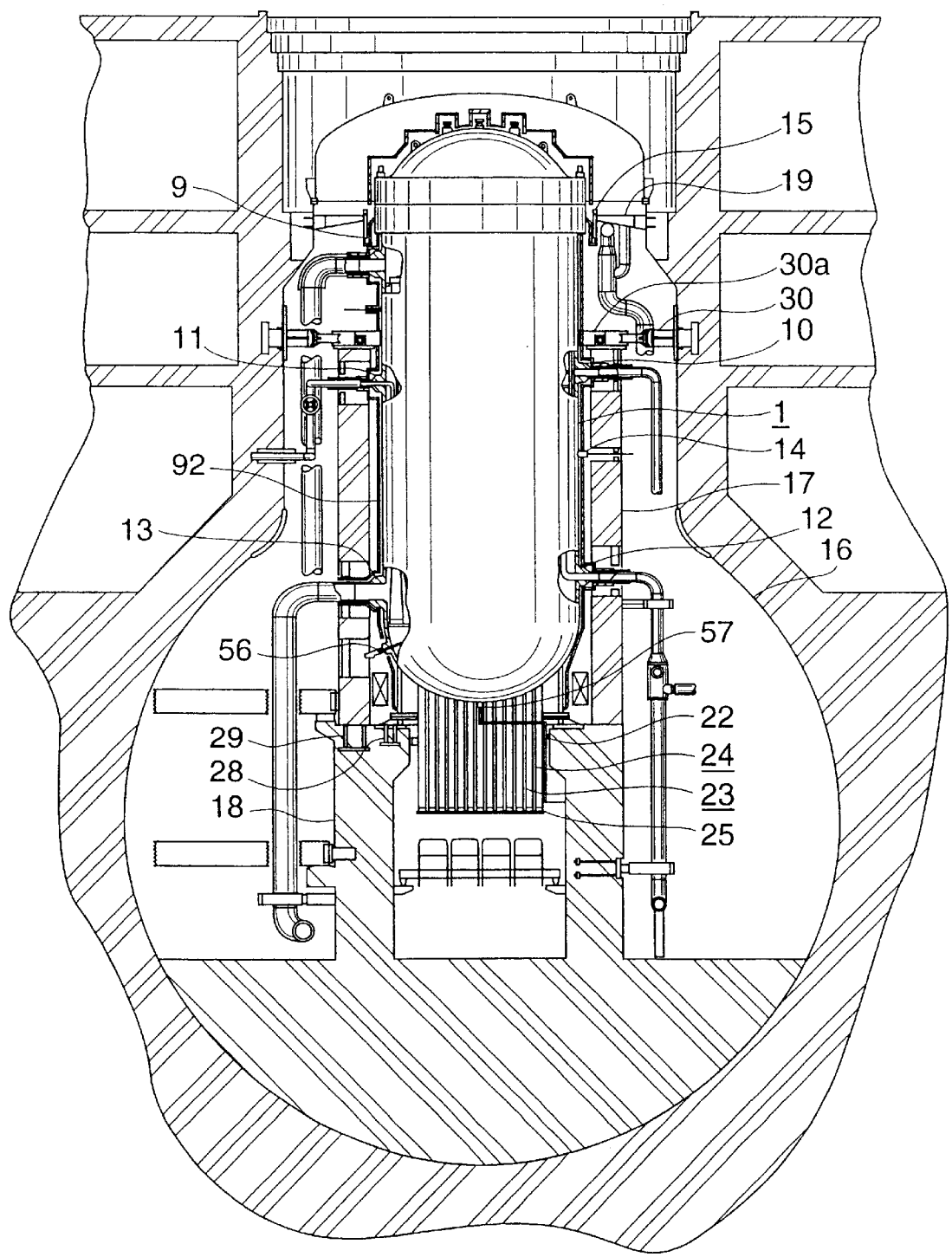
FIG. 3 is a cross sectional view of a reactor pressure vessel in the first embodiment of the present invention.

As shown in FIG. 3, the RPV 1 is disposed in the center of the PCV 16 and the RPV 1 is fixed to the RPV pedestal 18 with foundation bolts 28. On the side wall of the RPV 1 are disposed a main steam nozzle 9 for feeding the steam generated in the RPV 1 to the power generator; a feedwater nozzle 10 for feeding condensate water into the RPV 1; a reactor spray nozzle 11 for cooling the inside of the RPV 1; inlet and outlet nozzles 12 and 13 of a recirculation system for circulating reactor water in the RPV 1; a reactor core measuring nozzle 14 for various instrumentations in the RPV 1; a reactor core differential pressure instrumental nozzle 56 for measuring the pressure in the reactor; and an RPV drain nozzle 57 for draining reactor water from the RPV 1. An insulating material 192 is disposed on the outer periphery of the RPV 1. In the upper part of the PCV 16 are disposed a fuel change bellows 15 for partitioning the inner space of the PCV 16 and a bulk head plate 19. Inside the RPV pedestal 18 are disposed a control rod housing 23 (hereafter, to be referred to as a CRD housing) for guiding the control rods; a CRD housing support beam 22 (hereafter, to be referred to as a CRD beam) for supporting the CRD housing 23; a CRD housing support block 25 (hereafter, to be referred to as a CRD block); and an ICM housing 24 for supporting a monitor of neutrons in the reactor (hereafter, to be referred to as an ICM). The RSW 17 is fixed to the RPV pedestal 18 with foundation bolts 29. In the upper part of the RSW 17 are disposed a PCV stabilizer 30, which is an anti-vibration supporting member of the PCV 16 and an RPV stabilizer 30a, which is an anti-vibration supporting member of the RPV 1.

Figure 4:
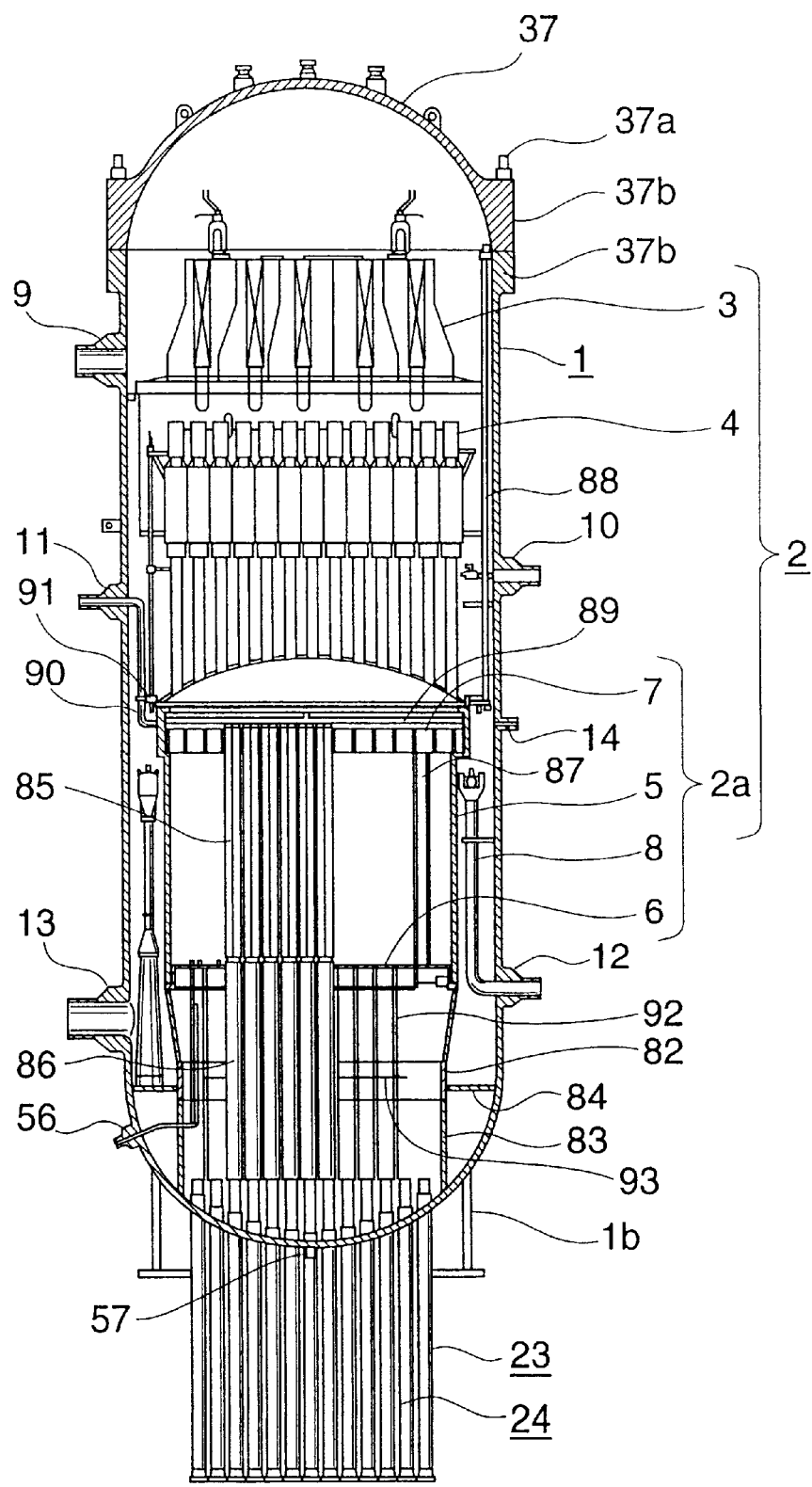
FIG. 4 is a cross sectional view of an RPV in the first embodiment of the present invention.

As shown in FIG. 4, the reactor core shroud (hereafter, to be referred to as a shroud) is disposed in the center of the reactor. The shroud 5 is supported by a shroud support cylinder 82. The shroud support cylinder 82 is supported by a baffle plate 84 and a shroud support leg 83 at the bottom of the RPV 1. Inside the shroud 5 is disposed an upper lattice plate 7, which supports the upper reactor core in its upper part and a reactor core supporting plate 6, which supports the lower reactor core in its lower part. In addition, control rods 85, control rod guide tubes 86, and fuel assemblies 87 are disposed in the shroud 11. A jet pump 8 is disposed between the shroud 5 and the RPV 1. In the upper part of the shroud 5 are disposed a steam drier 3; a steam separator & shroud head assembly 4; a guide rod 88, a feedwater sparger & pipe assembly 89, and a reactor core spray sparger & pipe assembly 90. The steam separator & shroud head 4 and the shroud 5 are fastened with bolts via ribs (not illustrated) disposed in the upper part of the shroud 5. In the lower part of the shroud 5 are disposed such equipment as an ICM housing 24, incore stabilizer 27, etc. The RPV head 37 is fixed to the RPV 1 with stud bolts 37a attached to the flange 37b. At the bottom of the RPV 1 are disposed a CRD housing 23 for storing a control rod driver 20 (hereafter, to be referred to as a CRD) and an ICM housing 24 for the ICM 21.

In the RPV 1 are disposed various types of equipment inside the reactor such way. The equipment in the reactor is divided into an incore structure 2 installed inside the RPV 1 and other structures than the incore one. The incore structure 2 is composed of a steam drier 3, a steam separator & shroud head 4, a shroud 5, a reactor core supporting plate 6, an upper lattice plate 7, a jet pump 8, etc.

Structures other than the in-core structure 2 are a main steam nozzle 9, a feedwater nozzle 10, a reactor core spray nozzle 11, a recirculation system inlet nozzle 12, a recirculation system outlet nozzle 13, a reactor core measuring nozzle 14, a reactor core differential pressure instrumental nozzle 56, an RPV drain nozzle 57, a CRD housing 23, and an ICM housing 24. Those structures are all disposed on the side wall (shell) of the RPV 1.

In this embodiment, the RPV is carried out from its nuclear power plant composed as described above.

The RPV is carried out in accordance with the flowchart shown in FIG. 1(a).

Hereunder, a method for carrying out such an RPV in this embodiment will be described. At first, a periodical inspection is done for the object nuclear power plant by disassembling the generator in step S1. In step S2, the reactor is opened. At this time, water is filled in the reactor well 32, that is, up to the level 67a of the reactor water 67. The step for opening the reactor includes removing of the PCV 16, removing of the RPV head 37, removing of the RPV head, removing of the steam drier 3, and removing of the steam separator & shroud head 4. The steam drier 3 and the steam separator & shroud head 4 are, when they are removed, moved into the equipment pool 81. When the steam drier 3 and the steam separator & shroud head 4 are removed, a large space is made at the upper side of the upper lattice plate 7 in the RPV 1. The work for opening the reactor is a necessary critical one required to remove the fuel assemblies 87 from the reactor. In this embodiment, the steam drier 3 and the steam separator & shroud head assembly 4 that are removed are used again as are. They may be replaced with new ones as needed.

Figure 5A:
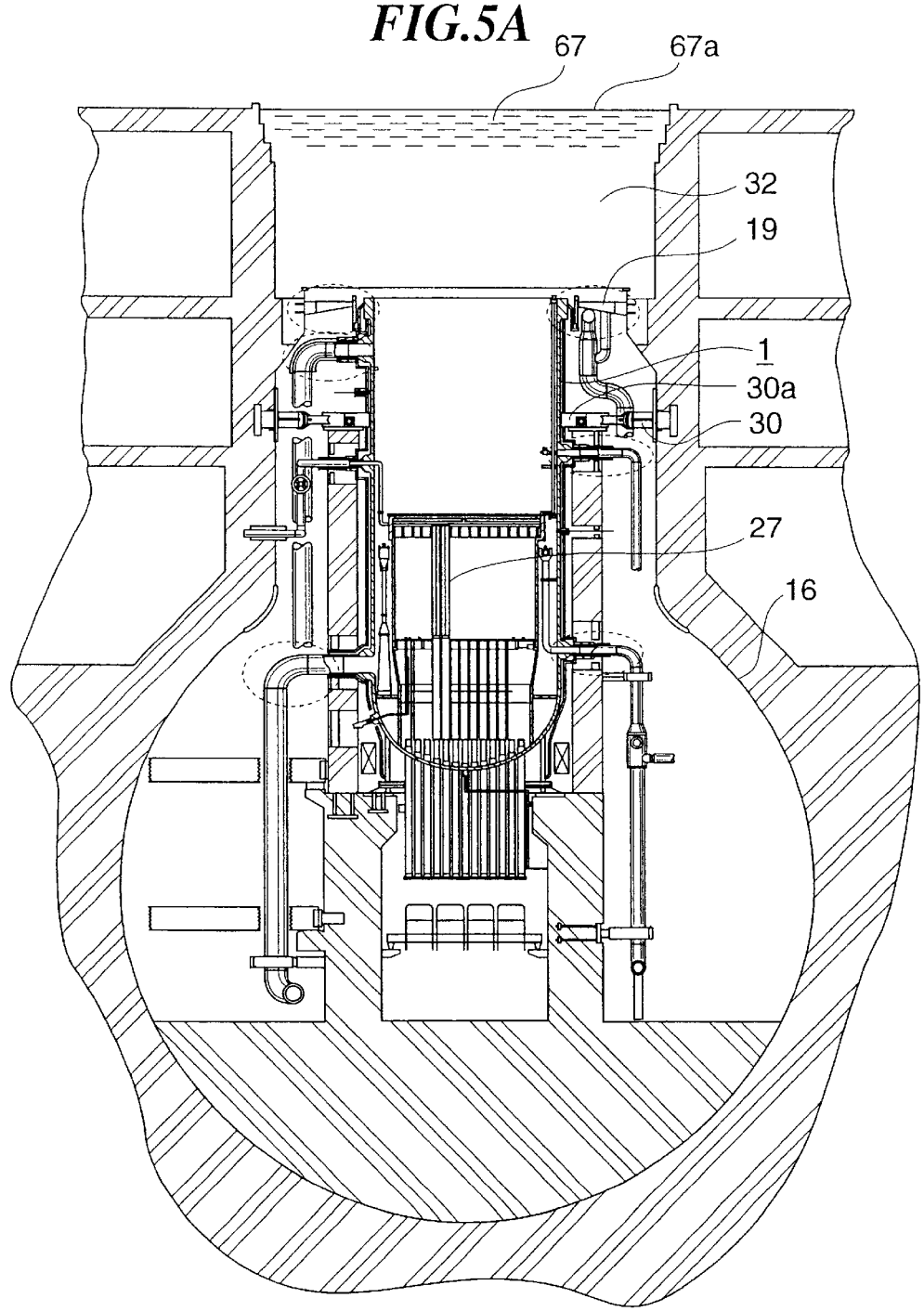
FIG. 5(a) shows a state of a work for taking out a fuel assembly in step S3 shown in FIG. 1(a).

Next, all the fuel assemblies 87 are removed from the RPV 1 in step S3 (FIG. 5(a)). The removed fuel assemblies 87 are then moved into a fuel rack 33a disposed in the spent fuel pool 33. At this time, the reactor water level 67a is set so as to fill the reactor well 6. Next, control rods 85 and control rod tubes 86 are carried out in step S4. The control rods 85 and the control rod tubes 86 are thus all moved into the fuel rack 33a disposed in the spent fuel pool 33. In this embodiment, it is premised that the control rods 85 and the control rod tubes that are removed are used again as they are. However, they may be replaced with new ones as needed. Consequently, a large space is made inside the reactor core shroud 5, since the fuel assemblies 87, the control rods 85, and the control rod tubes 86 are all removed from the reactor core shroud 5. The processes in steps S1 to S4 are the same as those in a normal periodical inspection.

Figure 5B:
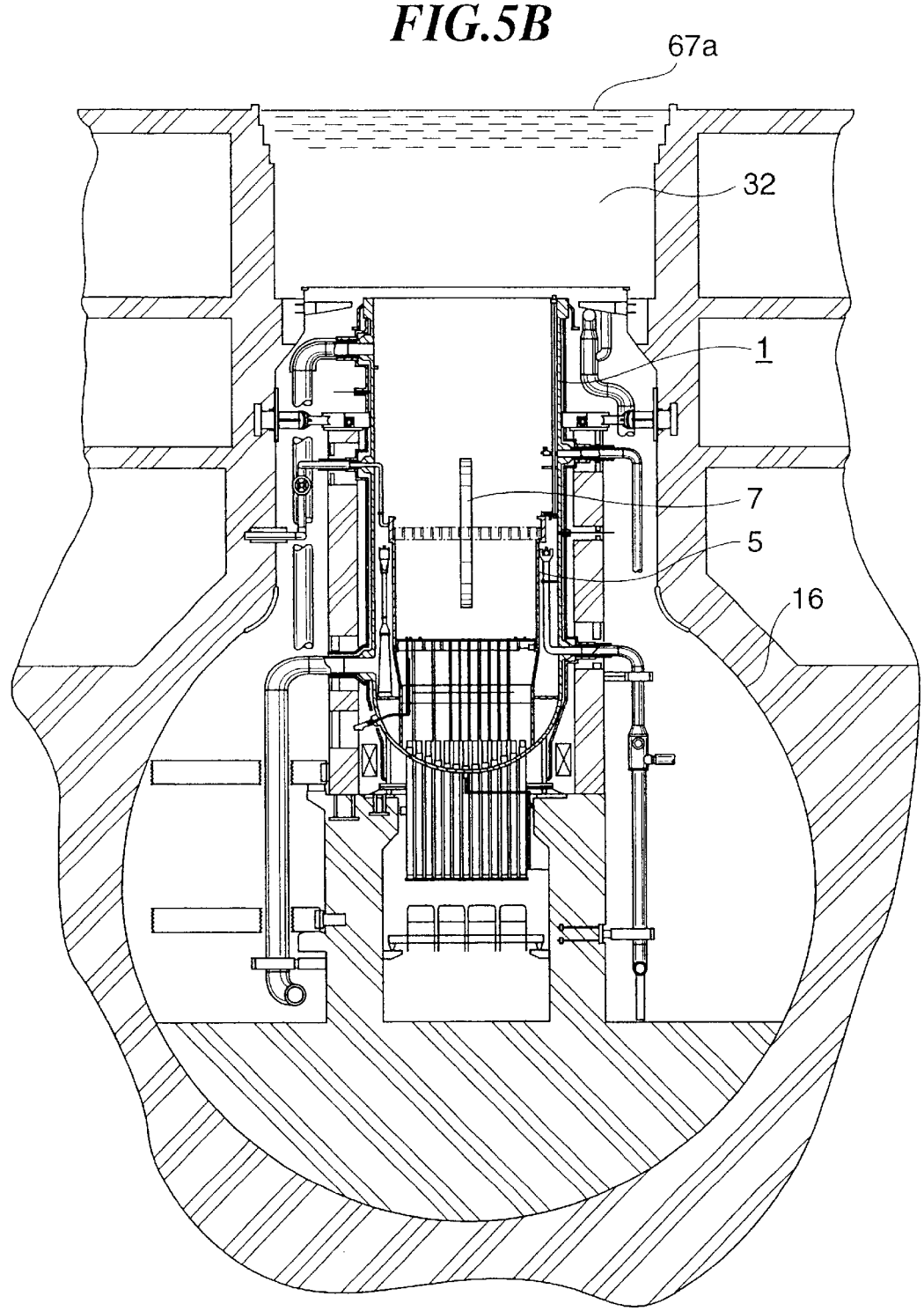
FIG. 5(b) shows a state of an upper lattice plate placed vertically in the upper part of a reactor core shroud.
Figure 5C:
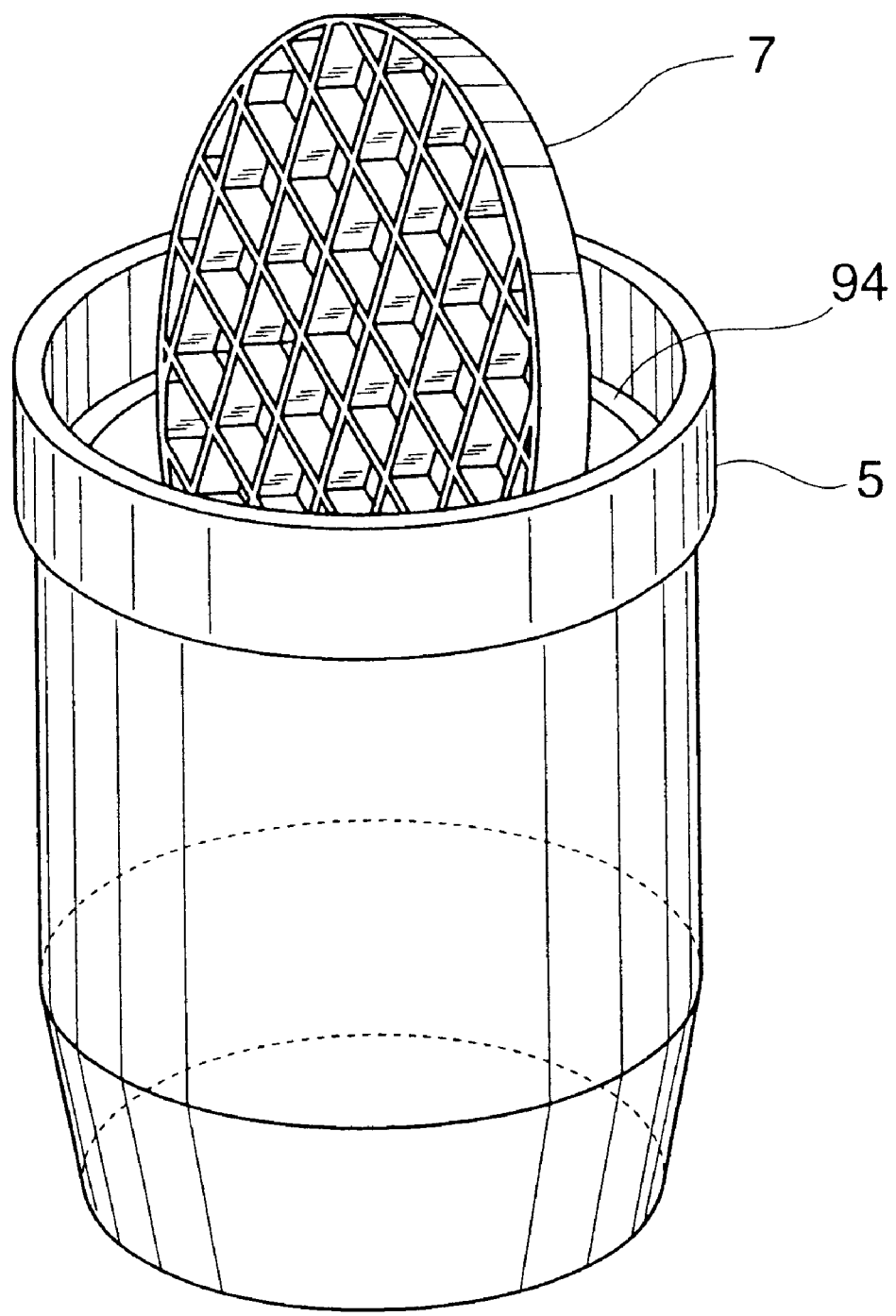
FIG. 5(c) shows a state of the upper lattice plate placed vertically in the upper part of the reactor core shroud.

Next, the upper lattice plate 7 is removed from the top of the reactor core shroud 5 and placed vertically in the upper part of the reactor core shroud 5 (FIG. 5(b)). The upper lattice plate 7 is thus placed vertically as shown in (FIG. 5(c)) in the upper part of the reactor core shroud 5 after it is removed from the top thereof. At this time, the reactor water level 67a must be set so as to fill the reactor well 32, since the radiation dose of the upper lattice plate 7 is high. Because the upper lattice plate 7 placed vertically is larger than the diameter of the reactor core shroud 5, the plate 7 is caught by the upper flange of the reactor core shroud 5. Consequently, it never falls in the reactor core shroud 5. The upper lattice plate 7 placed vertically is then fixed with a wire, etc. The upper lattice plate 7 placed vertically can thus be prevented from falling. At this time, a path can be secured at the bottom side of the upper lattice plate 7 inside the RPV 1 for wastes to be carried out from the containment building while the upper lattice plate 7 is left in the RPV 1. In addition, because the upper lattice plate 7 is left in the RPV 1 such way, the radiation dose to the surroundings can be reduced more than when the plate 7 is taken out from the RPV 1.

Next, processes in step S6 and step S20 are done in parallel. In step S6, the structures surrounding the RPV are disassembled. In step S20, the structures in the RPV pedestal 18 are disassembled. Although the processes in steps S6 and S20 are done together in this embodiment, the process in step S20 may be done after the process in step S6 or vice versa.

Figure 6:
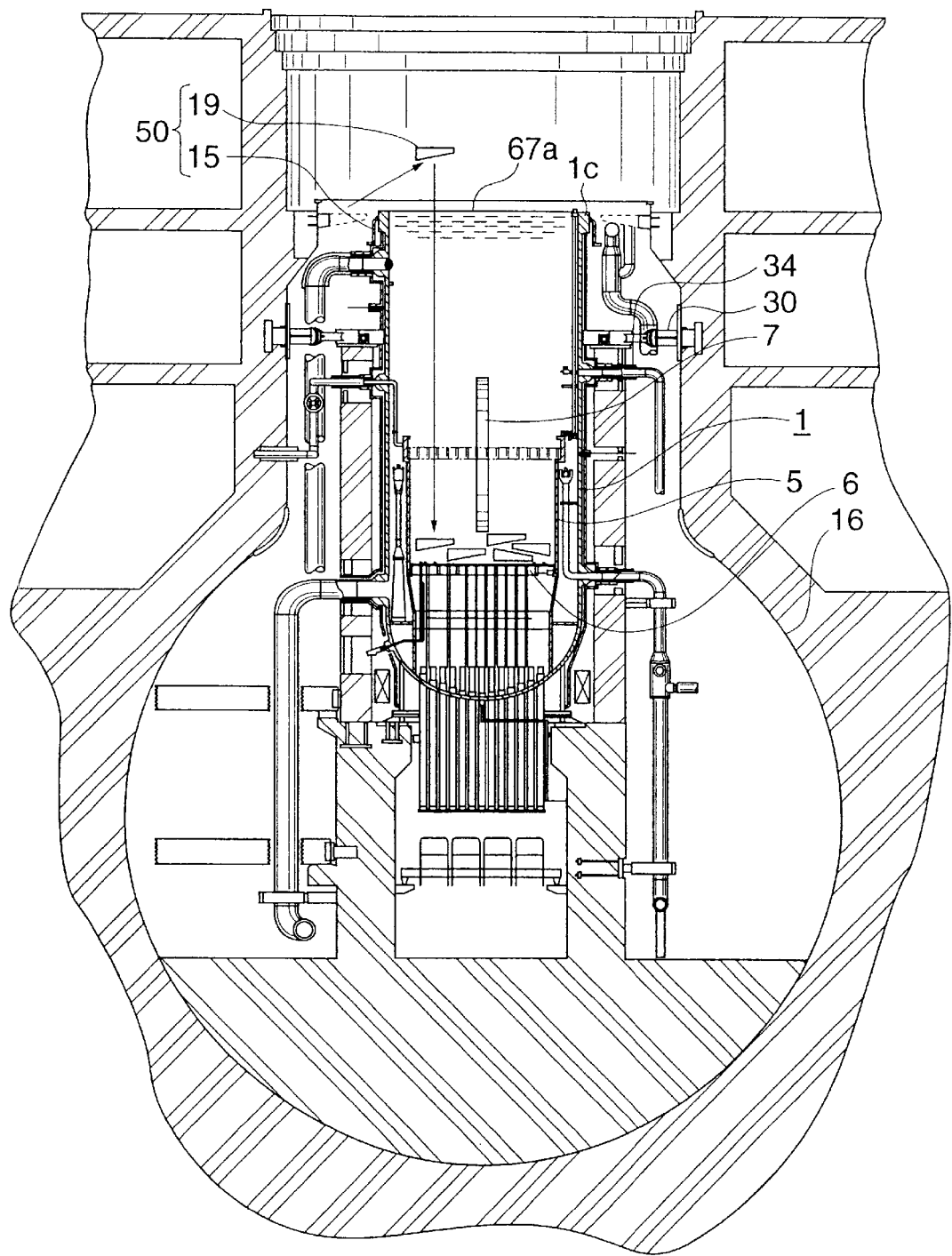
FIG. 6 shows how wastes are carried into the reactor.

Next the process in step S6 will be described. In this step S6, the RPV 1 is disconnected completely from the structures surrounding the RPV 1. In this embodiment, joints enclosed by a dotted line in FIG. 5(a) are disconnected. The details of the process in step S6 are steps S7 to S12. Hereunder, those detailed processes from step S7 to step S13 will be described sequentially. In step S7, the reactor water level 67a is lowered up to the RPV flange 1c as shown in FIG. 6. Then, the bulk head plate 19 and the fuel change bellows 15 are removed. The bulk head plate 19 and the fuel change bellows 15, when they are removed, are placed on the reactor core supporting plate 6 in the shroud 5 by inserting them through a gap between the vertically placed upper lattice plate 7 and the RPV 1. After that, the PCV stabilizer 30 is removed in step S8, then it is placed on the reactor core supporting plate 6 in the shroud 5 by inserting it through the gap between the vertically placed upper lattice plate 7 and the RPV 1. When this PCV stabilizer 30 is removed, a path is secured for moving the structures positioned between the RPV 1 and the PCV 16 and under the PCV stabilizer 30 into the RPV 1 via the reactor well 32.

Figure 1B:
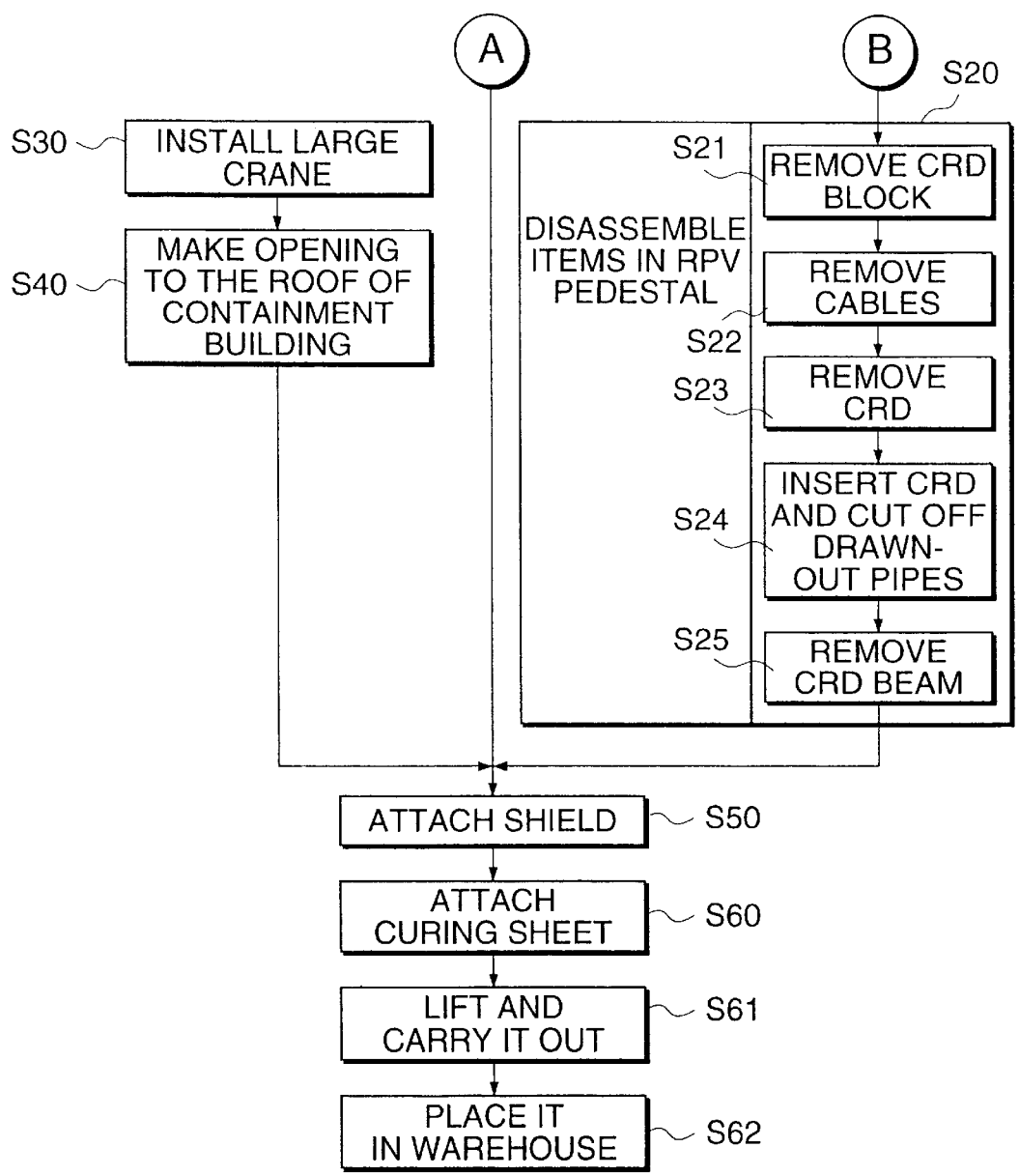
FIG. 1(b) is a flowchart of the details of the work in step S10 shown in FIG. 1(a).
Figure 7:
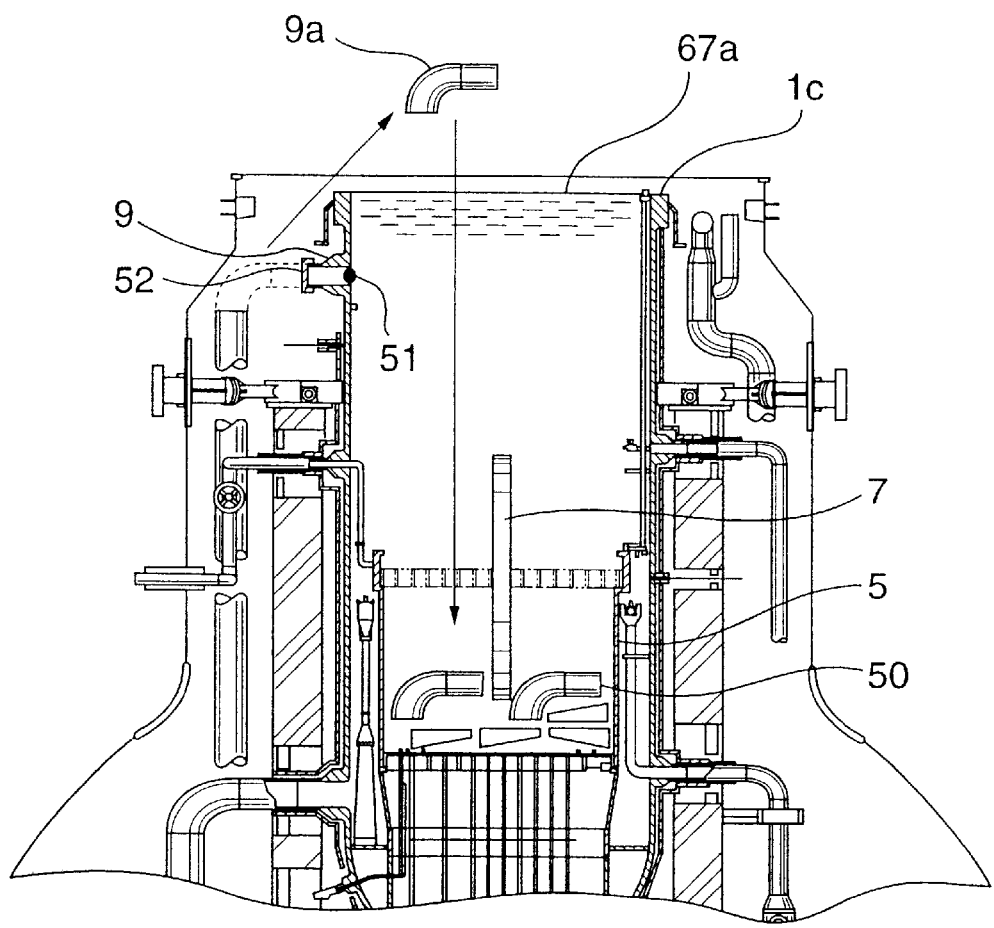
FIG. 7 shows how a pipe is carried into the reactor.

Next, step S10 will be described. As shown in FIG. 1(b), steps S101 to S109 are the details of step S10. At first, the reactor water level 67a is kept at the top of the RPV flange 1c as shown in FIG. 7 in step S101. Then, a water sealing plug 51 is inserted in the reactor so as to close the nozzle 9. Next, the main steam pipe 9a connected to the main steam nozzle 9 is cut off at a joint with the main steam nozzle 9 and at a bent-down portion of the main steam pipe 9a. After that, a nozzle sealing plate 52 is attached to the main steam nozzle 9 from outside the RPV 1. Then, cut-off pieces of the pipe 9a are placed on the reactor core supporting plate 6 in the shroud 5 by inserting them through the gap between the vertically placed upper lattice plate 7 and the RPV 1. The main steam pipe 9a may also be cut off by a method that the reactor water level is lowered under the opening of the main steam nozzle 9, then the reactor water level 67a is returned to the top of the RPV flange 1c after the nozzle sealing plate 52 is attached to the main steam nozzle 9.

Figure 8A:
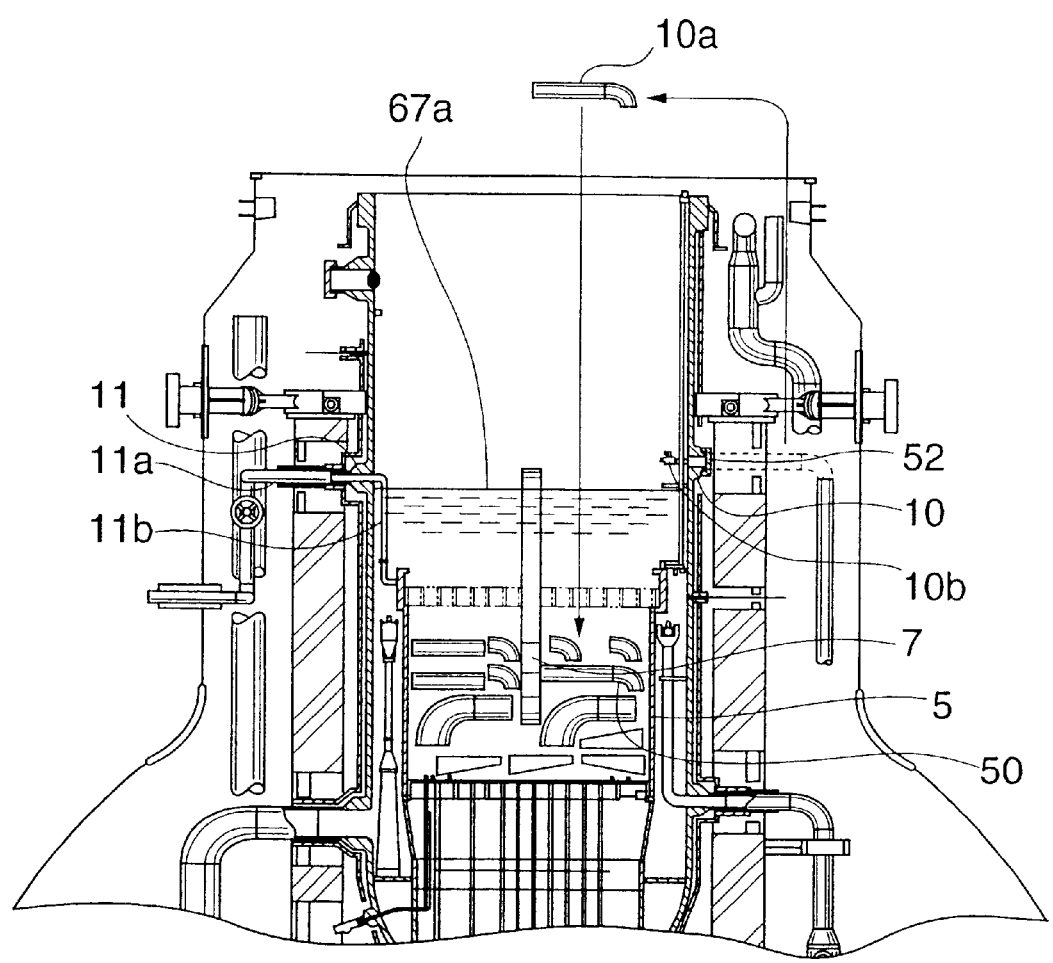
FIG. 8(a) shows how a pipe is carried into the reactor.
Figure 8B:
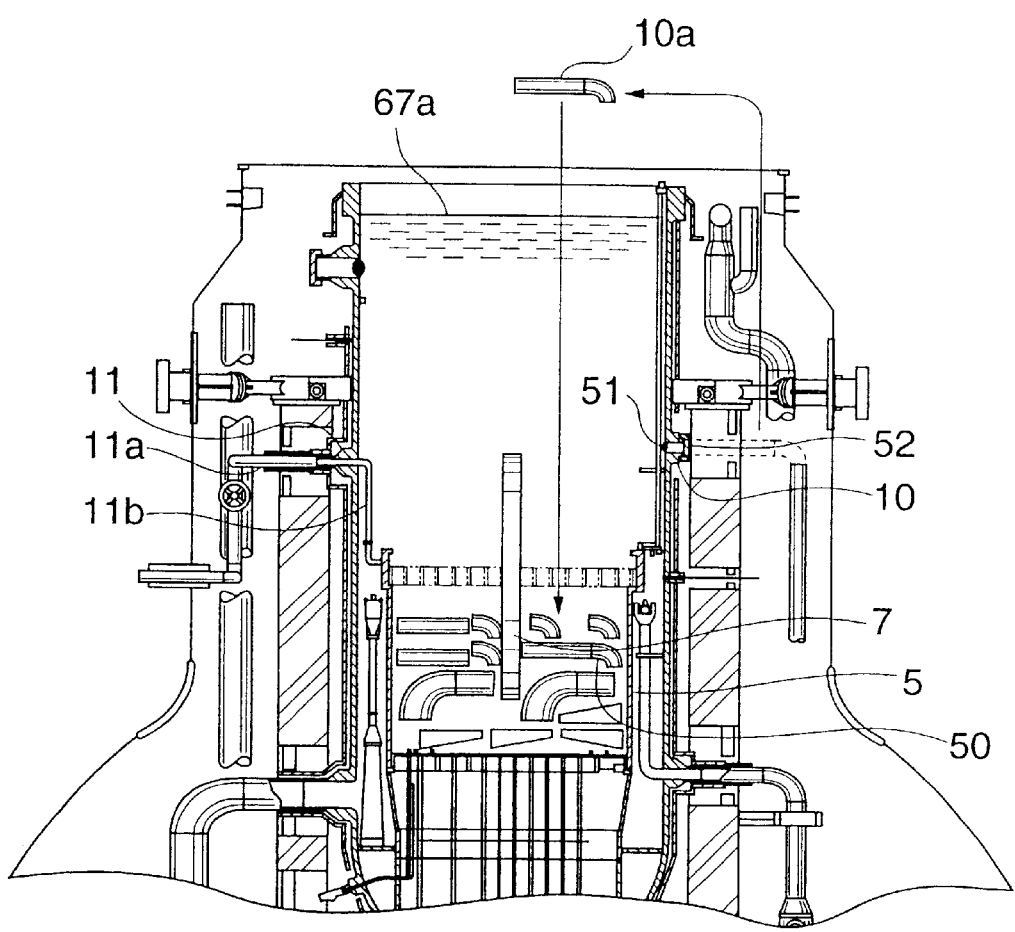
FIG. 8(b) shows how a pipe is carried into the reactor.

Next, both feedwater pipe 10a and reactor core spray pipe 11a connected to the feedwater nozzle 10 and the reactor core spray nozzle 11 are cut off in step S102, then they are moved into the RPV 1. Because the feedwater nozzle 10 and the reactor core spray nozzle 11 cut off in this step are connected to a feedwater sparger 10b and an incore spray pipe 11b, the water sealing plug 51 cannot be inserted in each of those nozzles 10 and 11, although it is possible in step S101. Consequently, the reactor water level 67a is lowered below the opening of the feedwater nozzle 10 and the opening of the reactor core spray nozzle 11 and the feedwater pipe 10a outside the RPV 1 and the reactor core spray pipe 11a are cut off respectively. Then, the nozzle sealing plate 52 is attached to both of the feedwater nozzle 10 and the reactor core spray nozzle 11 respectively. FIG. 8(a) shows a state of the feedwater pipe 10a cut off from the feedwater nozzle 10. The feedwater pipe 10a is cut off at a joint with the feedwater nozzle 10 and at a bent-down portion of the feedwater pipe 10a respectively after the reactor water level 67a is lowered below the opening of the feedwater nozzle 10. After the cutting, a nozzle sealing plate 52 is attached to the feedwater nozzle 10 from outside the RPV 1. Then, the cut-off pieces are placed on the reactor core supporting plate 6 in the shroud 5 by inserting them through the gap between the vertically placed upper lattice plate 7 and the RPV 1. The reactor core spray nozzle 11, as well as the reactor core spray pipes 11a and 11b are cut off in the same way. Finally, the reactor water level 67a is returned to the position of the RPV flange 1c. At this time, when the feedwater pipe 10a and the reactor core spray pipe 11a are cut off, the reactor water level 67a is kept at the position set in step S101 as shown in FIG. 8(b) with respect to the feedwater nozzle 10, the feedwater pipe 10a, and the feedwater sparger 10b. Then, the feedwater sparger 10b connected to the feedwater nozzle and/or incore spray pipe 11b connected to the reactor core spray nozzle 11 may be cut off from inside the RPV. After that, a water sealing plug 51 is inserted in each nozzle from inside the RPV, and then the feedwater pipe 10a and the reactor core spray pipe 11a may be cut off from outside the RPV and a nozzle sealing plate 52 may be attached to each of those pipes 10a and 11a in the same procedure as that in step S101. In this case, because the nozzle sealing plate 52 can be attached to each object pipe without lowering the reactor water level 67a, the reactor water will shield and further reduce the radiation dose of the workers.

The following procedure may also be used in step S102. At first, as shown in FIG. 8(a), the reactor water level 67a is set lower than the opening of the feedwater nozzle 10 and the opening of the reactor core spray nozzle 11, then the feedwater sparger 10b connected to the feedwater nozzle 10 and/or incore spray pipe 11b connected to the reactor core spray nozzle 11 are cut off from inside the RPV, then the water sealing plug 51 is inserted in each of those nozzles from inside the RPV. Next, the reactor water level 67a is raised up to the position set in step S101. After that, the feedwater pipe 10a is cut off at a junction with the feedwater nozzle 10 and at a bent-down portion of the feedwater pipe 10a. In the same way, the core spray pipe 11a is cut off. After that cutting, the nozzle sealing plate 52 is attached to the feedwater nozzle 10 and the reactor core spray nozzle 11 from outside the RPV respectively. Then, cut-off pipe pieces are placed on the reactor core supporting plate 6 in the shroud 5 by inserting them through the gap between the upper lattice plate 7 and the RPV 1. If this procedure is to be employed, it is possible to cut off the feedwater sparger and the reactor core spray sparger outside the reactor water. The cutting will thus become more easily. In addition, when the feedwater pipe 10a and the core spray pipe 11a are cut off, the reactor water can shield the radioactive rays, thereby the radiation dose of the workers can be reduced.

Figure 9:
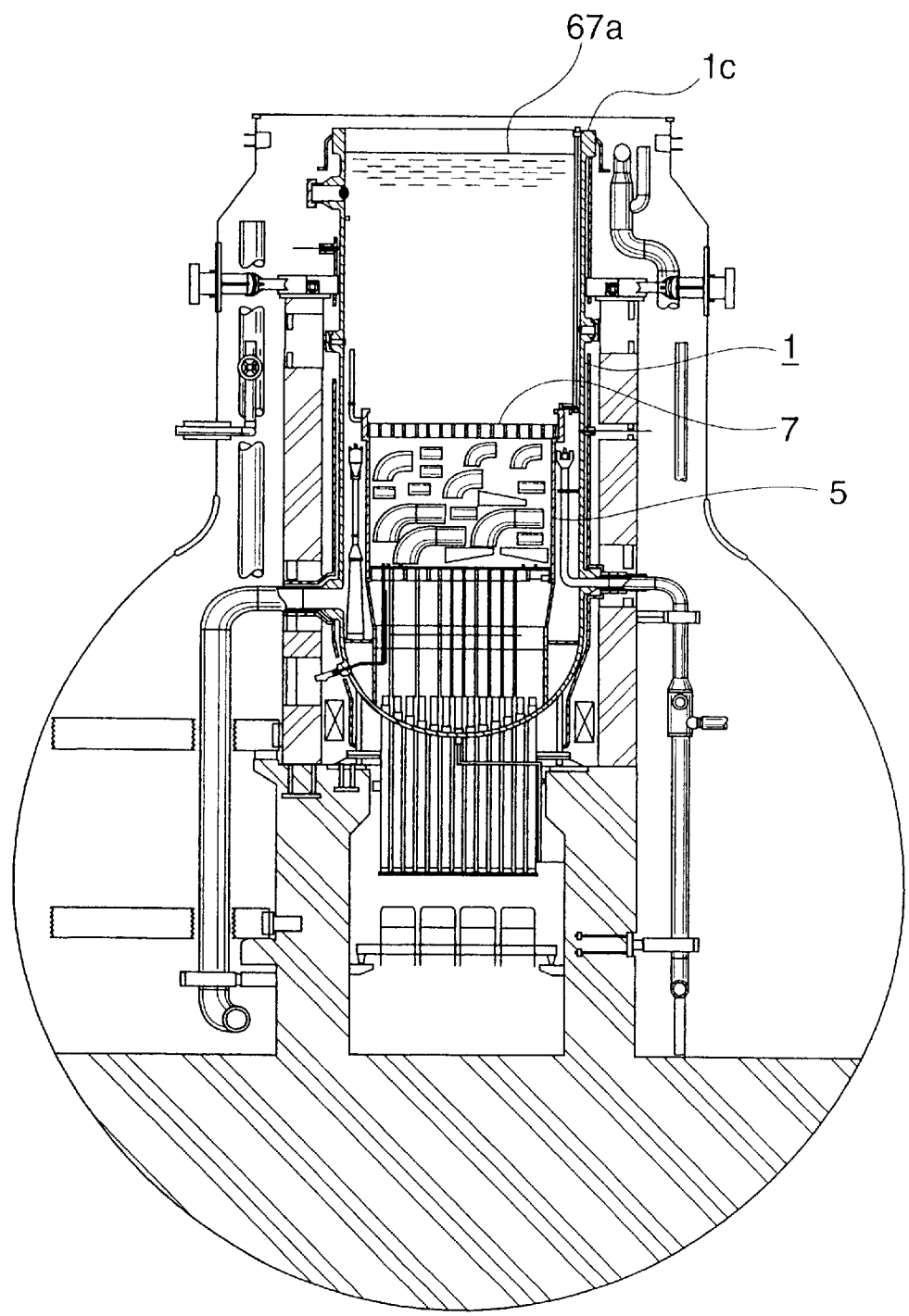
FIG. 9 shows the upper lattice plate returned to its horizontal position in the upper part of the reactor core shroud.

Next, step S103 will be described. In this step S103, the upper lattice plate 7, which has been placed vertically, is returned to its horizontal position as shown in FIG. 9. The reactor water level 67a is set at the position of the RPV flange 1c at this time. In this example, it is after the process in step S102 that the upper lattice plate 7 is returned to its horizontal position. However, the plate 7 may be returned to its horizontal position in step S103 if any trouble is expected to occur in the process for returning the plate 7 to its horizontal position due to extra structures to be carried into the shroud in step S101 or S102. It is also possible to move the upper lattice plate 7 into the equipment pool without placing the plate 7 vertically in step S5. The upper lattice plate 7 may be returned in the upper part of the shroud 5 in step S103 after object structures are all carried in the pool. After the process in step S103, structures to be carried into the RPV 1 are placed on the upper lattice plate 7 (???). In this case, it is no need to fix the upper lattice plate 7 with wire, etc., so the work is simplified and done easily.

Next, step S104 will be described. In this S104 step, the core measuring pipe 14a connected to the core measuring nozzle 14 is cut off and moved into the RPV 1. The core measuring nozzle 14 is disposed close to the fuel while the reactor is operating, so the radiation dose is high around the core measuring nozzle 14. Therefore, if the RSW plug (door) 17a is released and the core measuring pipe 14a outside the RPV 1 is cut off after the reactor water 67 is lowered up to the lower side of the core measuring nozzle 14, then the radiation dose of the workers might exceed a regulated value in the process for cutting off the pipe 14a.

Figure 22A:
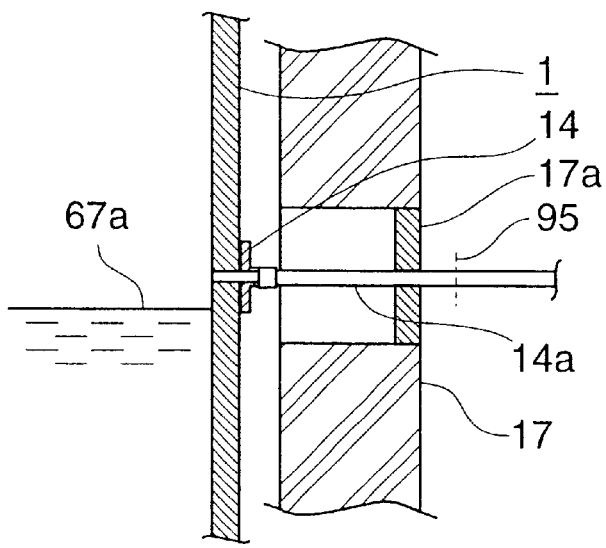
FIG. 22 shows how a reactor core measuring pipe is cut off.
Figure 22B:
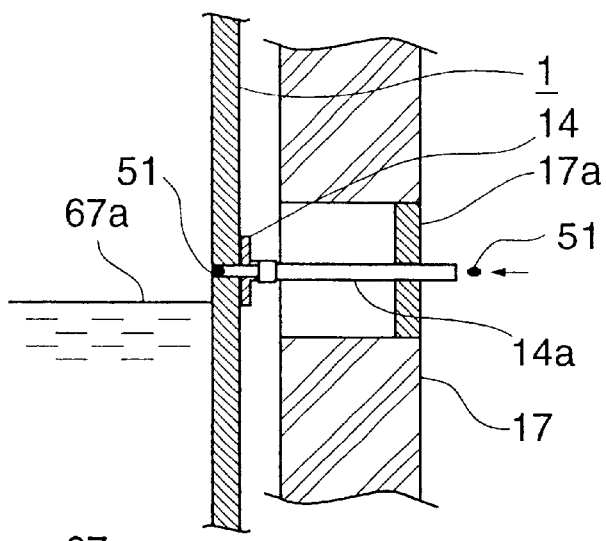
Figure 22C:
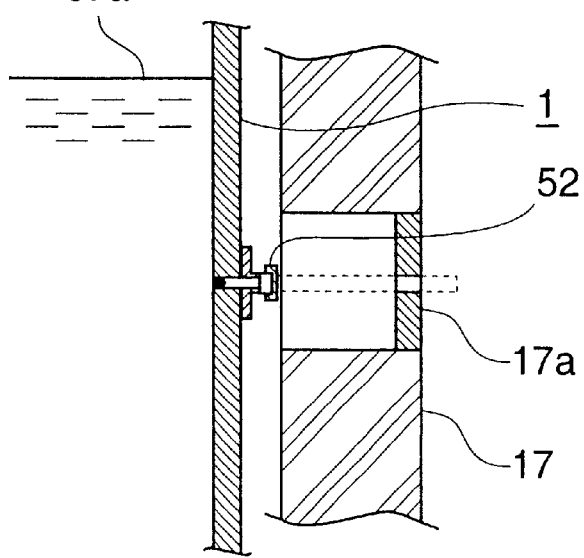

To avoid this, therefore, the following method is employed. At first, the reactor water level 67a is set lower than the core measuring nozzle 14 as shown in FIG. 22(a). Then, the pipe 14a is cut off at the position 95 set outside the RSW plug 17a. After that, as shown in FIG. 22(b), the water sealing plug 51 is inserted in the opening of the core measuring pipe 14a made by the cutting, thereby sealing the core measuring nozzle 14 from water. Then, as shown in FIG. 22(c), the reactor water level 67a is raised up to the upper side of the shroud 5.

Next, the RSW plug 17a is released and the core measuring pipe 14a is cut off at a joint with the core measuring nozzle 14. After that, a nozzle sealing plate 52 is welded to the outer side of the core measuring nozzle 14. The plate 52 may be fastened with bolts. Then, the RSW plug 17a is closed. After the setting, cut-off pipe pieces are carried into the RPV 1 and placed on the upper lattice plate 7(???). Consequently, the core measuring nozzle 14 protruded from the RPV 1 through the RSW 17 can be cut off while the dose of the workers is suppressed within a regulated value. The core measuring pipe 14a may also be cut off not only at a joint between the core measuring pipe 14a and the core measuring nozzle 14, but also at a position protruded from the RPV 1 when a water sealing plug 51 is attached if the protruded portion does not interfere with the inside of the RSW 17 when the RPV 1 is moved upward.

Figure 10:
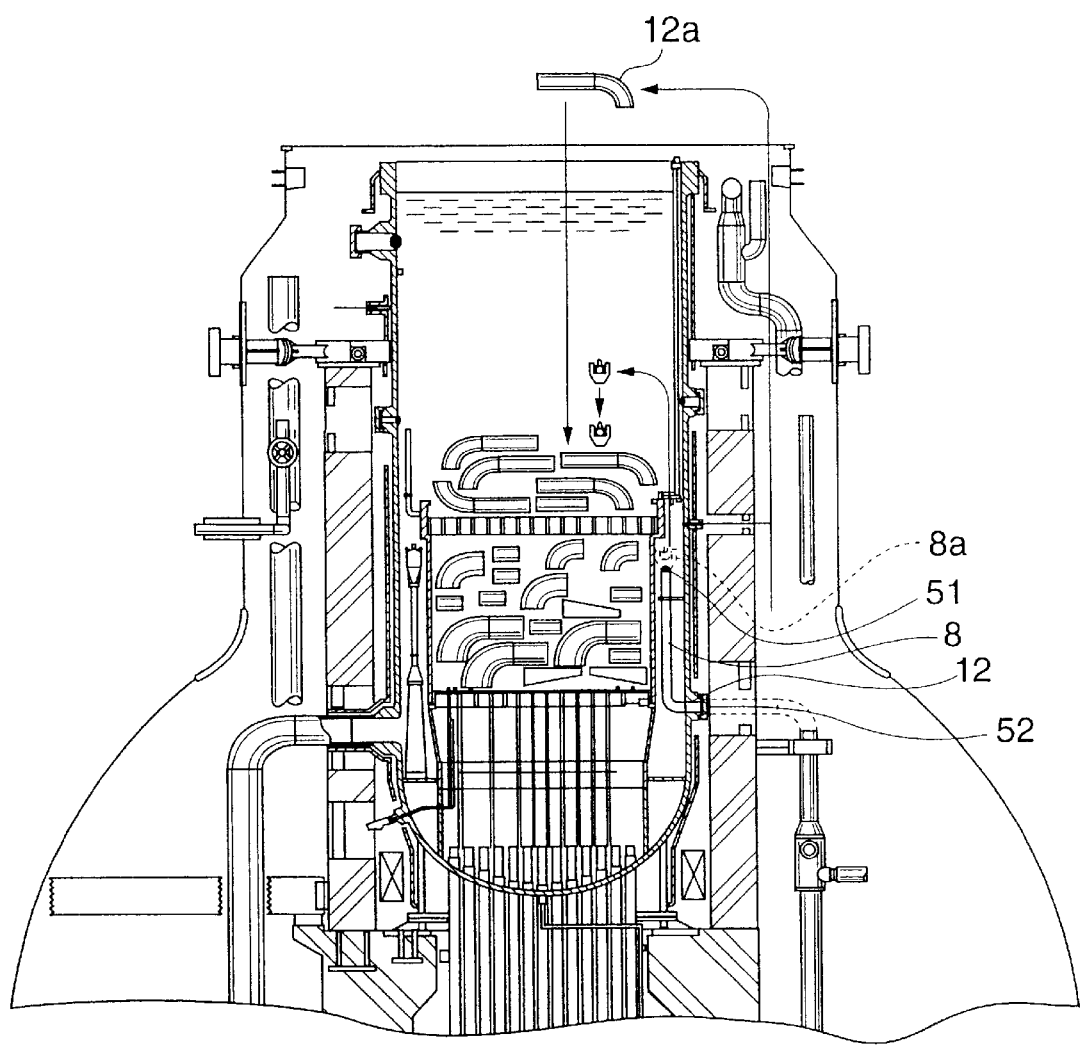
FIG. 10 shows how an inlet pipe of a recirculation system is cut off and carried into the reactor.

Next, step S105 will be described. In step S105, the reactor water level 67a set in step S104 is kept as is while a water sealing plug 51 is attached to a jet pump 8 and the inlet pipe 12a of the recirculation system is cut off and carried into the reactor. As shown in FIG. 10, the inlet nozzle 12 of the recirculation system is connected to the jet pump 8 inside the reactor. Therefore, an inlet mixer 8a, which is part of the jet pump 8, is removed first, then a water sealing plug 51 is inserted in the removed portion. Then, the inlet pipe 12a of the recirculation system is cut off outside the RPV 1 at a joint with the inlet nozzle 12 of the recirculation system and at a bent-down portion of the inlet pipe 12a of the recirculation system. After the cutting, a nozzle sealing plate 52 is attached to the inlet nozzle 12 of the recirculation system outside the RPV 1. After that, the cut-off pipe pieces are placed on the upper lattice plate 7. With this procedure, the reactor water can shield the radioactive rays, so the dose of the workers can be reduced. This process may also be done as follows; when the inlet pipe 12a of the recirculation system is to be cut off, the reactor water level 67a is lowered up to the lower side of the opening of the inlet nozzle 12 of the recirculation system, then the inlet pipe 12a of the recirculation system is cut off and a nozzle sealing plate 52 is attached to the nozzle 12, then the reactor water level 67a is returned to the upper part of the RPV flange. In such a case, it is no need to remove the inlet mixer 8a. The work is thus simplified.

Figure 11:
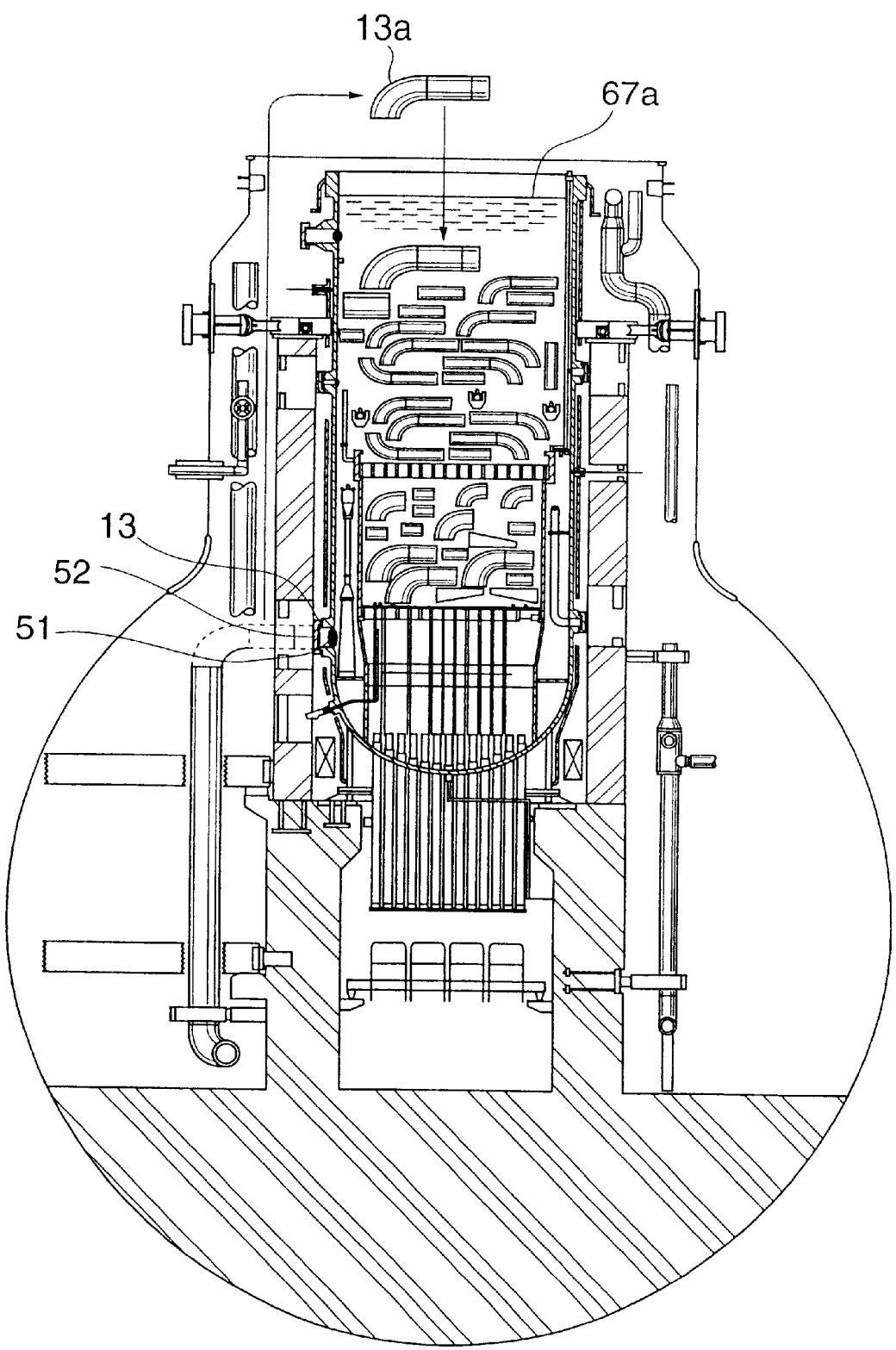
FIG. 11 shows how an outlet pipe of a recirculation system is cut off and carried into the reactor.

Next, step S106 will be described. In step S106, the reactor water level 67a set in step S104 is kept as is while the outlet pipe 13a of the recirculation system is cut off and carried into the reactor. At first, as shown in FIG. 11, a water sealing plug 51 is inserted in the nozzle 13 at the outlet of the recirculation system from inside the reactor. Then, the outlet pipe 13 of the recirculation system is cut off from inside the RPV 1 at a joint with the outlet nozzle 13 of the recirculation system and at a bent-down portion of the outlet pipe 13 of the recirculation system. After the cutting, a nozzle sealing plate 52 is attached to the outlet nozzle of a recirculation system 13 from outside the RPV 1. The cut-off pipe pieces are then placed on the upper lattice plate 7. According to this procedure, the reactor water can shield the workers from radioactive rays, thereby the dose of the workers can be reduced.

Next, step S107 will be described. In step S107, pipes connected to all the nozzles of the RPV, which are disposed lower than the outlet nozzle 13 of the recirculation system, are cut off and placed on the upper lattice plate 7. The core differential pressure instrumental nozzle 56 is also cut off at this time. When those pipes are cut off, the reactor water level 67a is set lower than the joint of each pipe with the RPV 1 before the nozzles are cut off. After each nozzle cutting, a nozzle sealing plate 52 is attached to the object nozzle and cut-off pieces are placed on the upper lattice plate 7. For the nozzles positioned lower than the outlet nozzle 13 of the recirculation system to be cut off in step S107, the reactor water shields the workers from radioactive rays, since they work away from the reactor area. The radiation dose will thus become comparatively low. The workers' exposure to radiation will also be suppressed within a regulated value during the work for cutting off and carrying out such pipes as the core differential pressure instrumental pipe 56a connected to the core differential pressure instrumental nozzle 56.

Next, step S108 will be described. In step S108, the RPV drain pipe 57a connected to the RPV drain nozzle 57 is cut off and a nozzle sealing plate 52 is attached to the nozzle 57 after the reactor water 67 is drained completely from the RPV 1 through the RPV drain nozzle 57.

Figure 12:
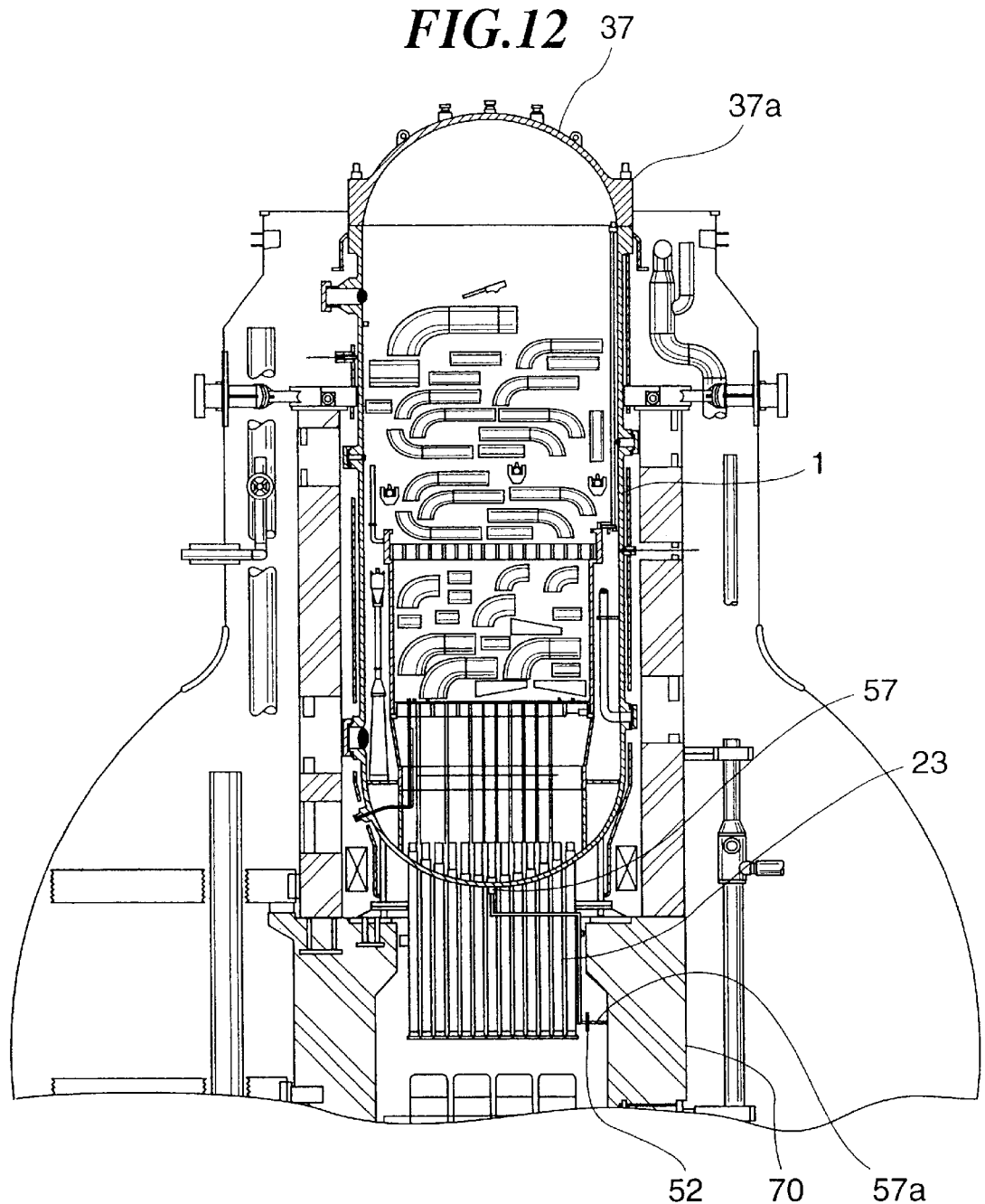
FIG. 12 shows a state of an RPV drain pipe that is cut off.

The RPV drain pipe 57a connected to the RPV drain nozzle 57 is disposed between the CRD housings 23, so the pipe 57a is carried out together with those CRD housings 23. The RPV drain pipe 57a is cut off at a position in the RPV pedestal 70 so that the pipe 57a, when carried together with the RPV 1, does not interfere with the RPV pedestal 70. Then, a nozzle sealing plate 52 is attached to the cut-off portion of the pipe 57a. Then, the cut-off pipe pieces are placed on the upper lattice plate 7 (FIG. 12). This competes the process in step S10.

Next, step S11 will be described. In step S11, the RPV head 37 is placed on the RPV flange with use of a ceiling crane, then the head 37 is attached to the RPV 1 with RPV stud bolts 37a.

Next, step S12 will be described. In step S12, the RPV stabilizer 30a, which is an anti-vibration supporting member of the RPV 1, is removed. Then, the RSW 17 is separated from the RPV 1.

Next, step S20 will be described. In step S20, structures in the RPV pedestal are disassembled, then the RPV 1 is disconnected from the RPV pedestal 18. As shown in FIG. 1(a), step S20 is divided into steps S21 to S25.

In step S21, the CRD block 25 is removed as follows. At first, the nuts fastening the CRD block are loosened, thereby the CRD block is removed. After that removal, the CRD block is stored in a storage area (not illustrated) outside the RPV pedestal.

Next, the cables are disconnected from both CRD 20 and ICM 21 in step S22. For the ICM, the cable terminal connector is released first, then the cable is removed. For the CRD, control rods are disconnected from the CRD first, then the PIP (CRD position detector) connector is removed, thereby both cable and PIP are drawn out from the CRD. After that removal, the CRD block, as well as cables and PIP are moved into the storage area (not illustrated) prepared outside the RPV pedestal.

Next, the CRD 20 is removed in step S23 as follows. At first, the bolts in the lower part of the CRD are loosened with use of a CRD changer (not illustrated) installed at the RPV pedestal, then the CRD itself is removed. The CRD is placed in the storage area (not illustrated) prepared outside the RPV pedestal. Processes in steps S21 to S23 are usually carried out in a periodical inspection.

Next, a pipe 26 used to insert/draw out the CRD is cut off in step S24 as follows. The pipe 26 is cut off at a position around the inner wall of the RPV pedestal. After that, the CRD beam 22 is removed in step S25 after it is cut off with use of a cutting machine. A gas may be used to cut off the CRD beam 22 instead of the cutting machine used in steps S24 and S25.

In this embodiment, processes in steps S6 and S20 can be carried out in parallel so as to shorten the working time. The process in step S20 may also be carried out after the process in step S6 or vice versa.

Figure 19:
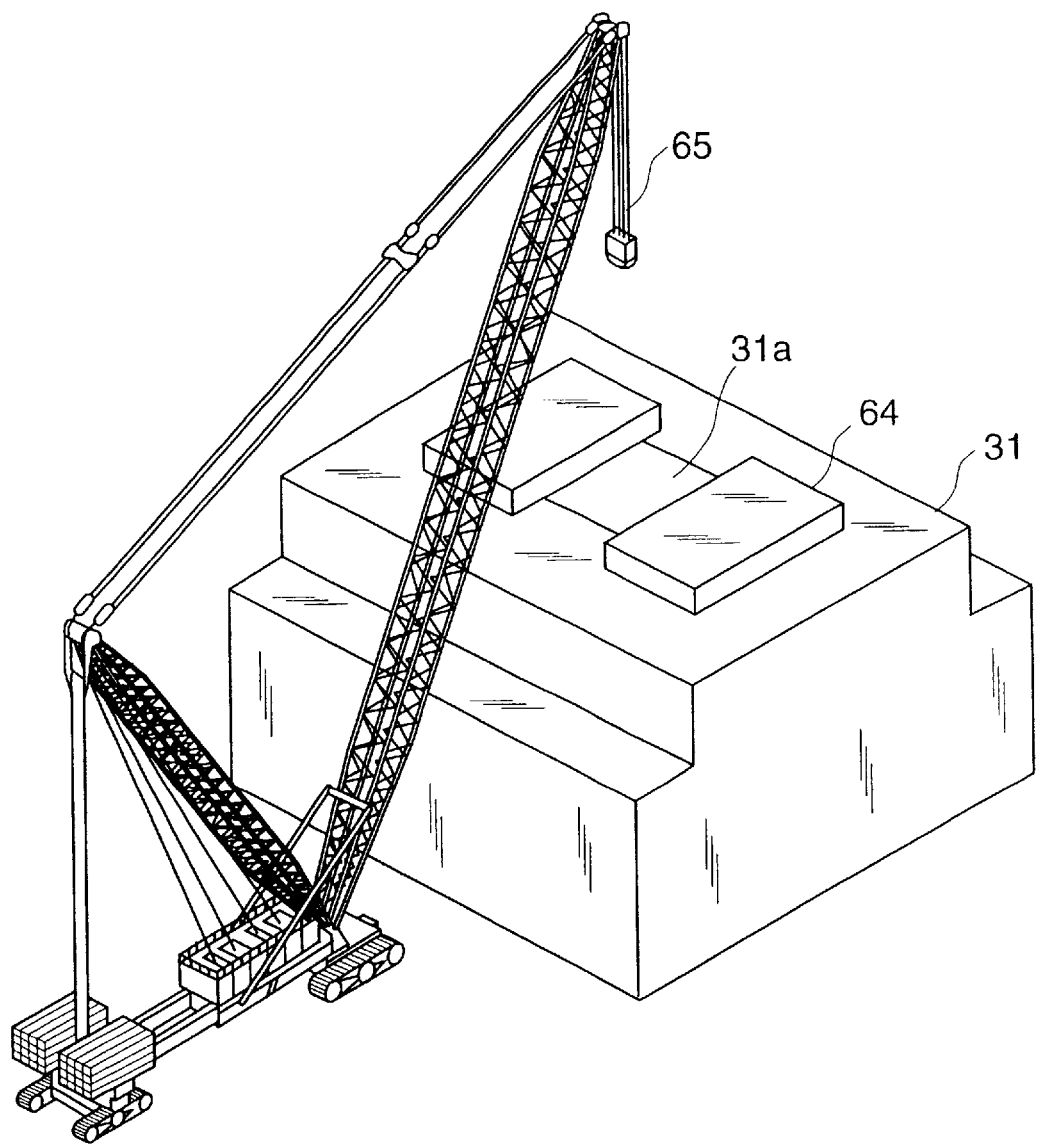
FIG. 19 shows how a crane is installed outside a containment building.

Next, a crane 65 is installed in step S30, thereby an opening 31a for carrying out the RPV 1 is made in the roof of the containment building (hereafter, to be referred simply to as an opening) in step S40 as follows. As shown in FIG. 19, at first the crane 65 is installed outside the containment building 31, then an opening 31a is made in the roof of the containment building 31. In addition, opening equipment 64 is installed in the temporary opening 31a. The equipment 64 can open/close the opening 31a. The temporary opening 31a is made in the upper part of the RPV 1 in a size decided according to the size of the RPV to be carried in, the size of a shield disposed for the RPV 1, the size of a lifting jig for carrying out the shield, swinging of the shield when in carrying it in and out, etc. Because the size of the temporary opening 31a is decided by taking the swinging of each structure to be passed through this temporary opening 31a into consideration, these structures to be passed through the opening 31a can avoid coming in contact with the containment building. In addition, the negative pressure of the containment building 31 can be managed properly in rains and/or during a work with use of the opening equipment 64 to be opened and closed freely. The crane 65 may be installed any time in step S30 and the opening 31a may be made any time in step S40 if they are done before the shield is attached in step S50.

Figure 13:
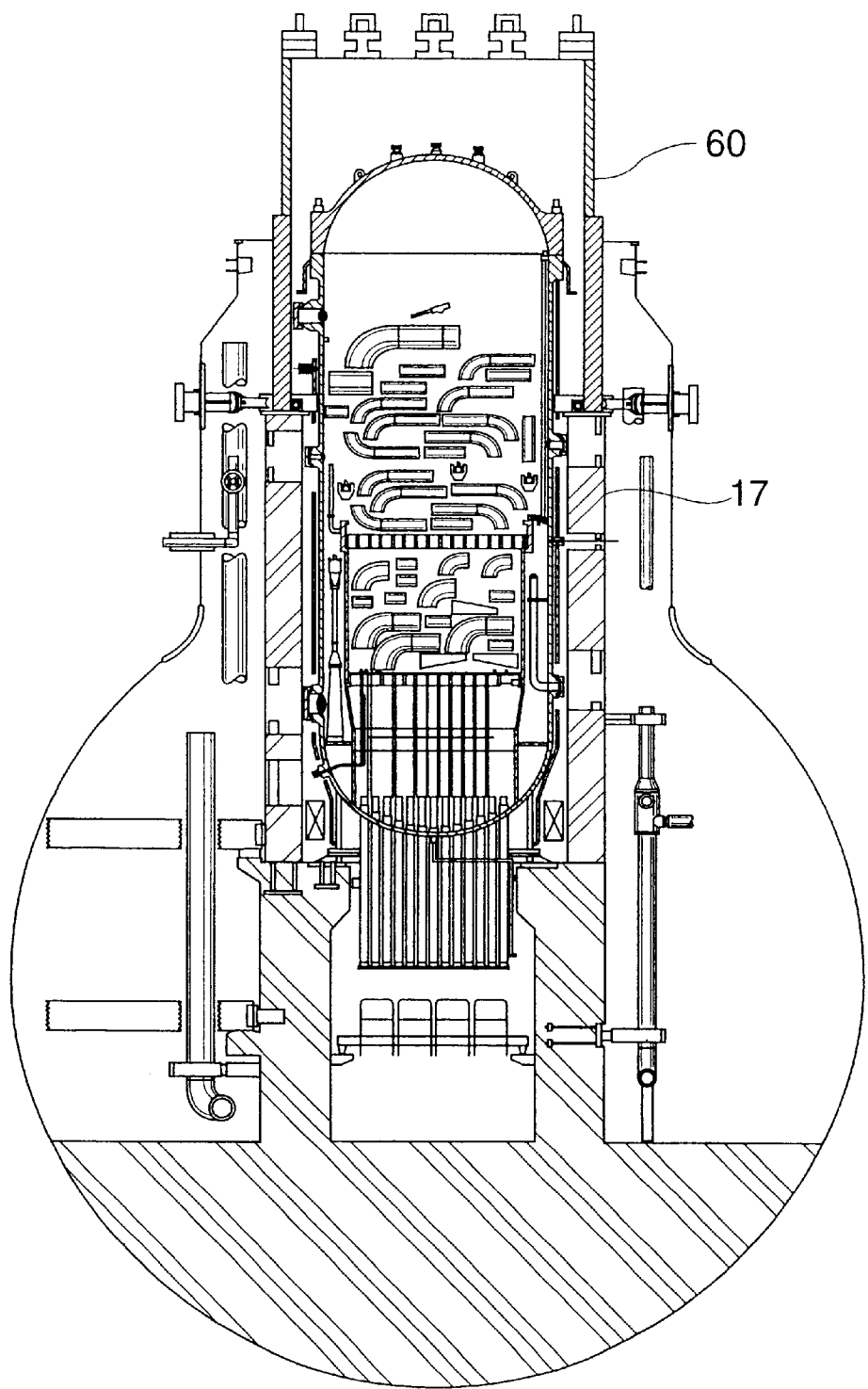
FIG. 13 shows a state of a shield placed on an RSW temporarily.
Figure 20:
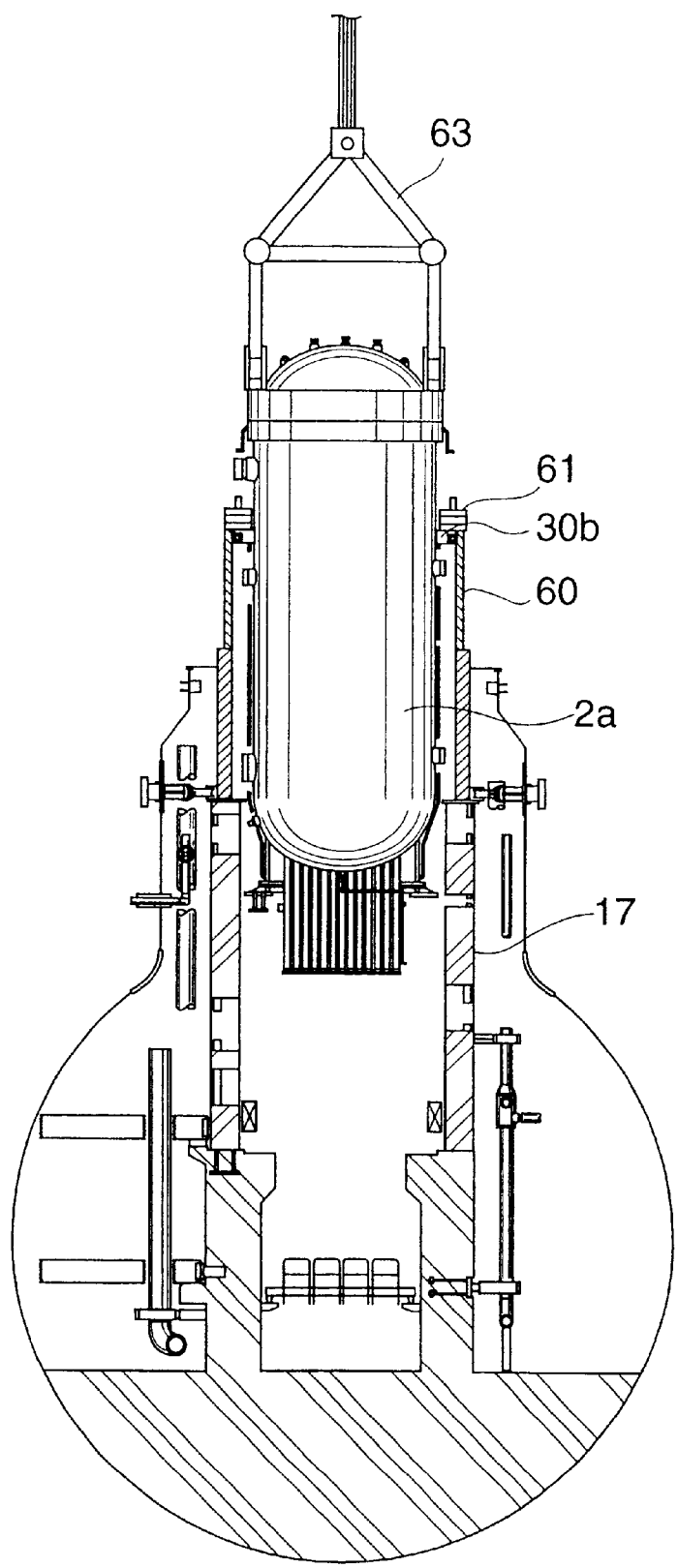
FIG. 20 shows how a shield is fit on an RPV.
Figure 21:
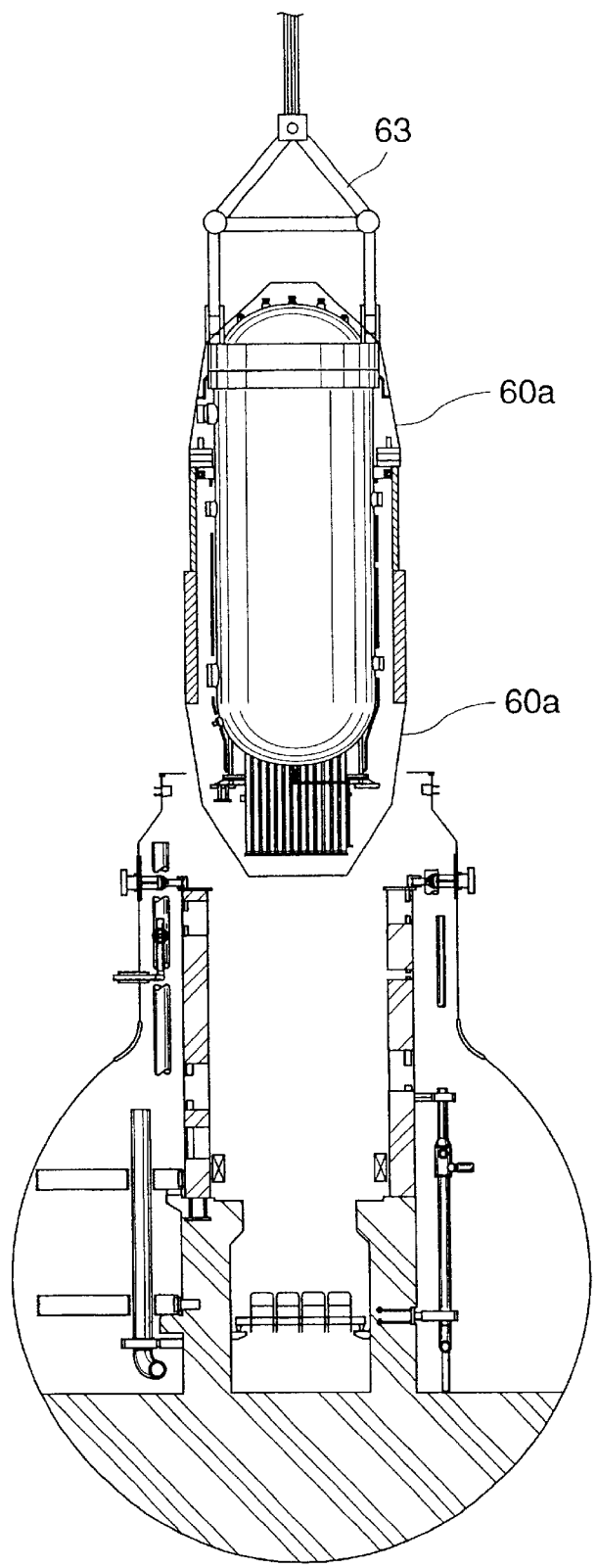
FIG. 21 shows how the RPV is sealed by a shield and a curing sheet.

Next, the cylindrical shield 60 is carried into the containment building in step S50 with use of the crane 65. Then, as shown in FIG. 13, the shield 60 is placed on the top surface of the RSW 17 temporarily. Then, a strong back (lifting jig) 63 is attached to the RPV 1. After that, the RPV 1 is lifted up and an RPV 1 stabilizer bracket 30b is fit in the stopper 61 attached to the upper part of the shield 60 as shown in FIG. 20. Consequently, the shield 60 can be attached in a reactor core area, in which fuel assemblies are loaded during a normal RPV operation. After that, a curing sheet 60a is put on the following structure in step S60. As shown in FIG. 21, both RPV 1 and shield 60 are lifted up by the crane 60, then the RPV head 37, the lower CRD housing 23, etc. that are positioned higher than the shield, are covered with the curing sheet 60a, then the end portions of the curing sheet 60a are sealed fixedly with sealing tape (not illustrated). The curing sheet 60a may be a vinyl chloride sheet, or the like. With this, the RPV 1 loaded with wastes and sealed there and to be carried out of the containment building are covered with both shield 60 and curing sheet 60a, thus shielded completely from radioactive rays.

Figure 14:
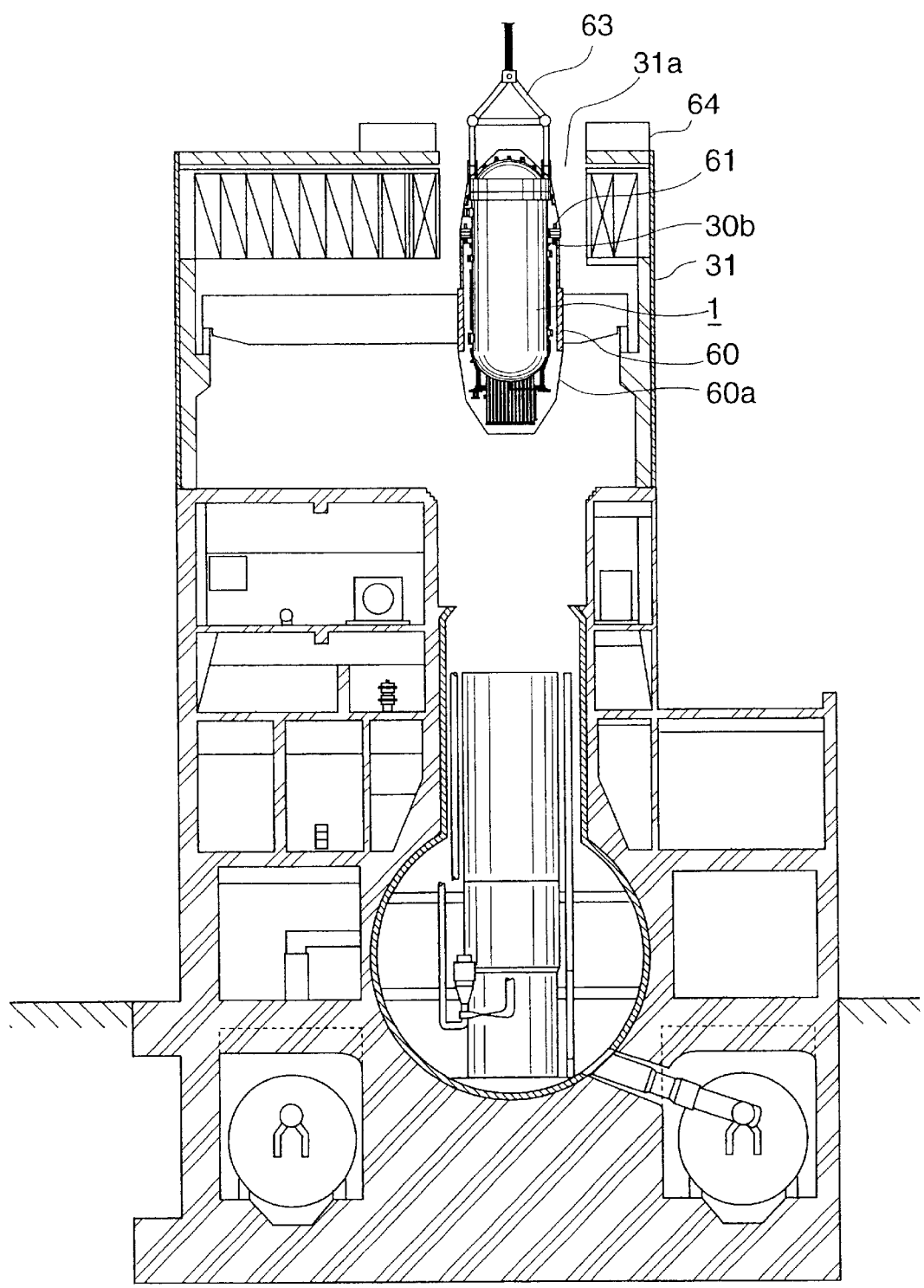
FIG. 14 shows how both RPV and shield are carried out from an opening.

Next, the RPV 1 is lifted up in step S61 as follows. At first both RPV 1 and shield 60 are lifted up with use of the crane 65 as shown in FIG. 14, then carried out of the containment building 31 through the opening 31a. Before the carry-out operation, the shield 60 is checked for surface contamination. After the carry-out operation, the equipment 64 is closed.

Figure 15:
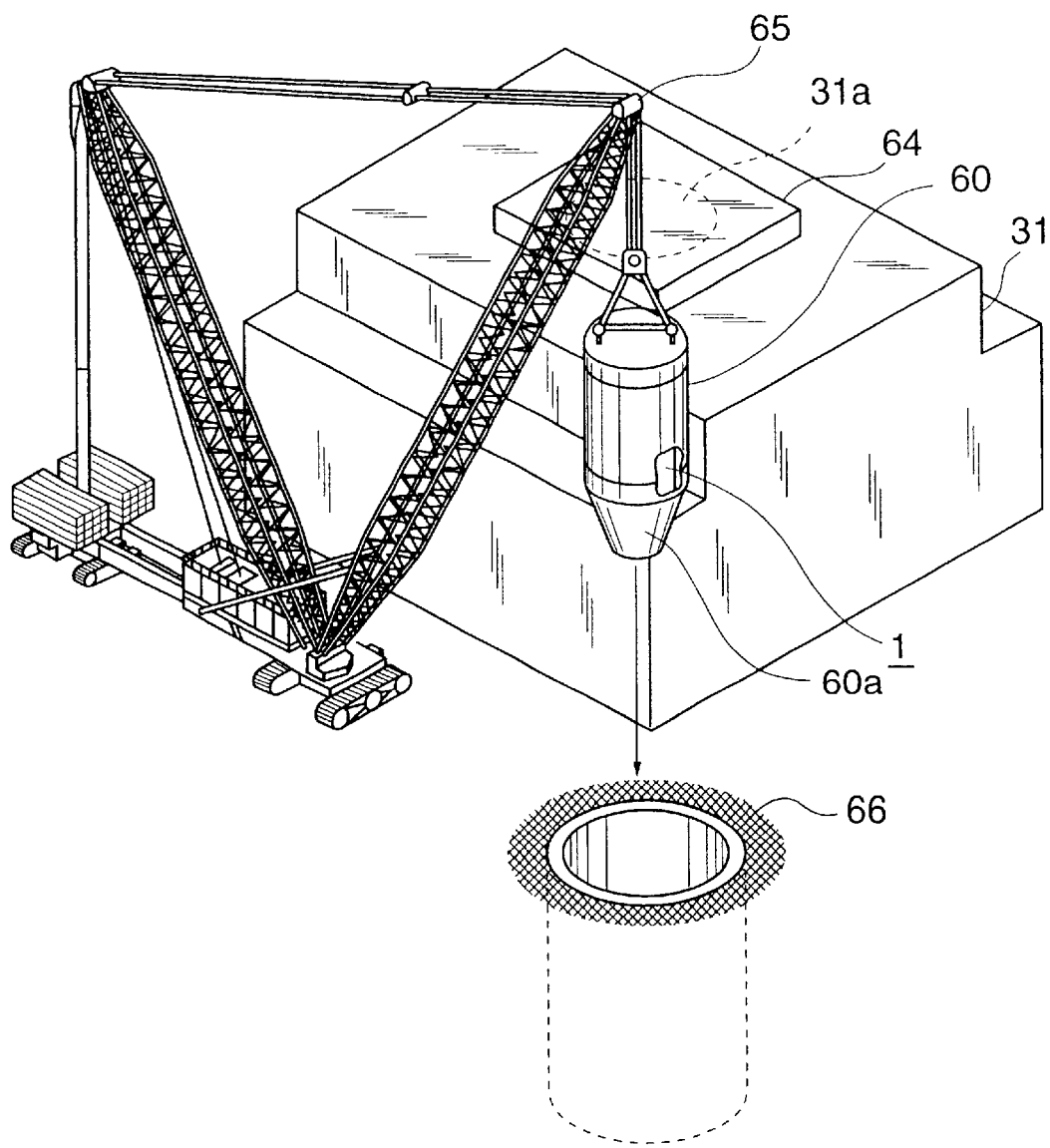
FIG. 15 shows how both RPV and shield are carried into a storage.

Next, both RPV 1 and shield 60 are placed in a storage in step S62 as follows. As shown in FIG. 15, a vertical underground type storage 66 is prepared around the containment building 31 and the crane 65 is turned towards the storage 66 while lifting up the shield 60 carried out of the containment building 31. The shield 60 is then carried into the storage 66. After the carry-in operation, the storage 66 is closed and sealed with a lid. Both RPV 1 and shield 60 may also be put on a trailer and transported to a storage prepared far away from the containment building. The storage 66 may be prepared in a building connected to the containment building 31.

According to this embodiment, because wastes are put in an RPV and carried out together with the RPV from the object containment building, it is possible to carry out a plurality of wastes at once from the containment building. The number of times for carrying out the wastes can thus be reduced more than the background art method for carrying out RPV and wastes separately. Consequently, the working time for carrying out wastes from the containment building can also be reduced. In addition, the number of casks and shields used while those wastes go half around the containment building can be reduced. In addition, because the RPV is lifted up in a shield placed temporarily on the top surface of the RSW when the shield is attached to the RPV, the shield can be attached to the RPV easily. In addition, the radiation dose applied into the containment building from the reactor core area of the RPV can be reduced.

(Second Embodiment)

Figure 1C:
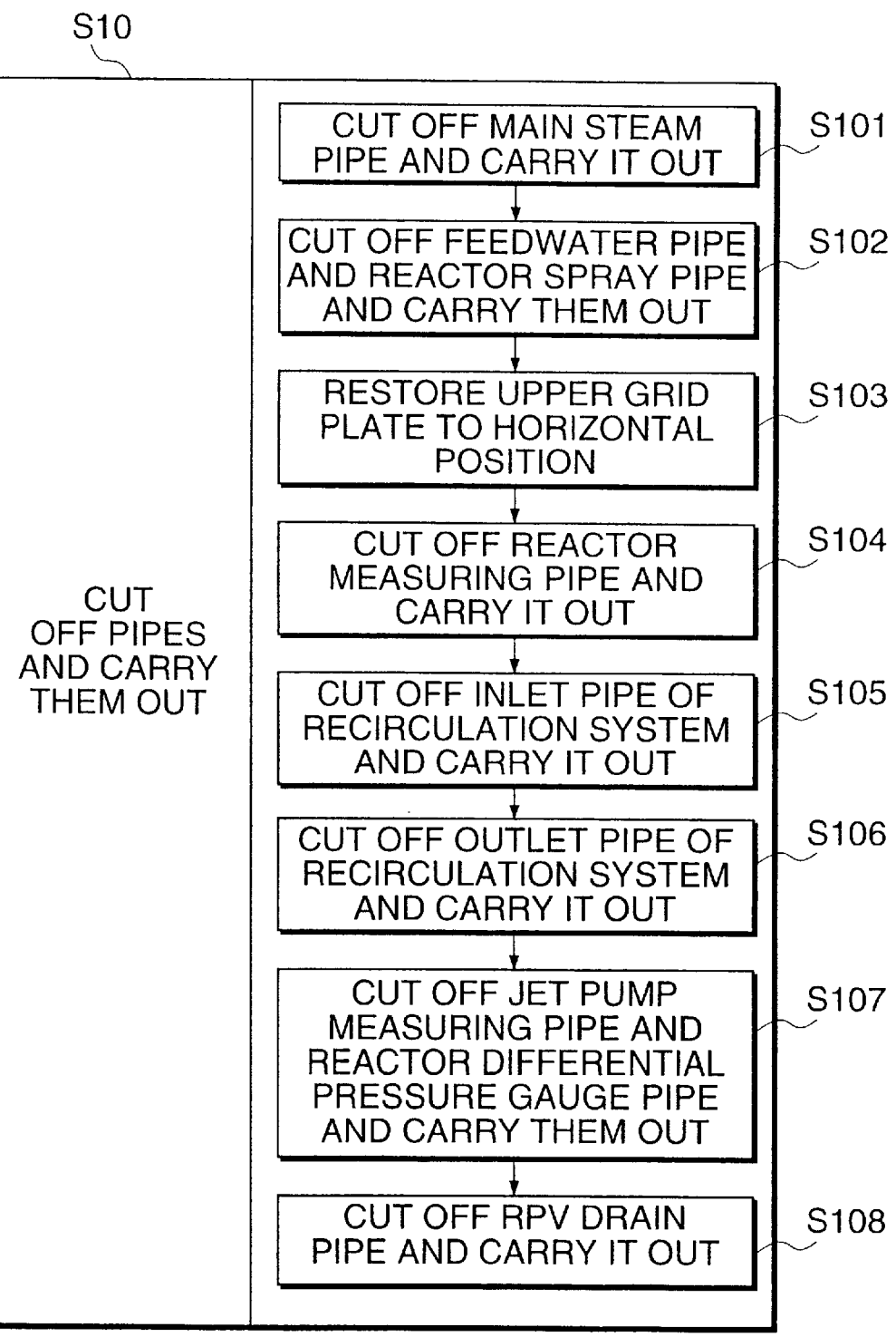
FIG. 1(c) is a flowchart of a procedure for carrying out object items in the second embodiment of the present invention.

Next, a description will be made for a method for carrying out the equipment of a nuclear power plant in the second embodiment of the present invention. This embodiment describes a method that a hole is made in the upper lattice plate 7 installed on the top of the reactor core shroud 5 in step S5 in the first embodiment, then cut-off or removed pipes and wastes of structures are put in the reactor core shroud 5 through the hole. Hereunder, this embodiment will be described with reference to FIG. 1(c). Except for that step S5 in FIG. 1(a) in the first embodiment is replaced with step S5a shown in FIG. 1(c) and step S103 shown in FIG. 1(b) in the first embodiment is deleted in this embodiment, other procedures are the same as those in the first embodiment. The descriptions for the same items will thus be omitted, avoiding redundant description.

Figure 16:
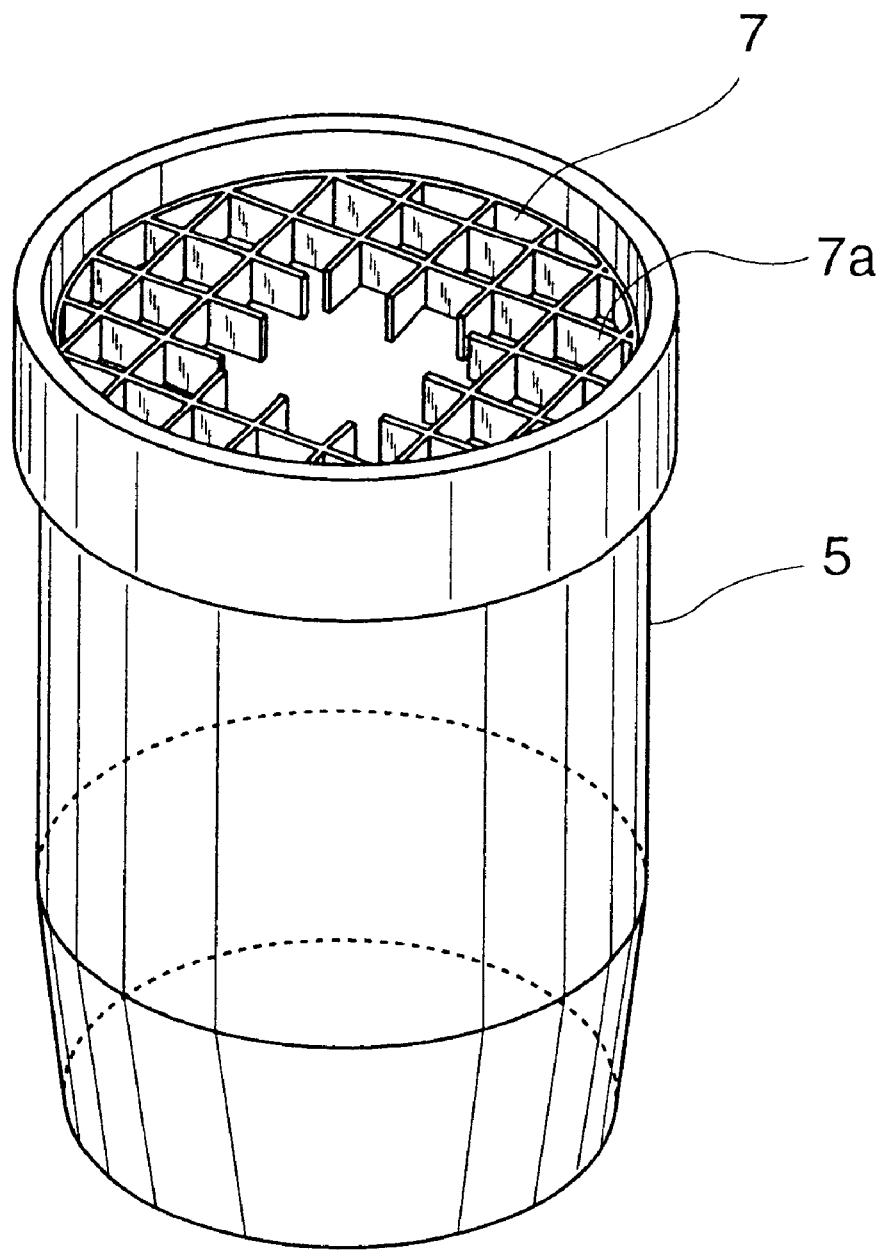
FIG. 16 shows a hole made in the upper lattice plate.

Next, step S5a will be described. In step S5a, the lattice 7a of the upper lattice plate 7 located on top of the reactor core shroud 5 is cut off and a hole is made in the upper lattice plate 7 as shown in FIG. 16. The lattice 7a of the upper lattice plate 7 is about 15 mm in thickness. This lattice 7a can thus be cut off and a hole can be made in the upper lattice plate 7. In addition, cut-off chips of the lattice 7a generated when the hole is made in the upper lattice plate 7 are placed in the reactor core shroud 5. At this time, the reactor water level 67a must be set so as to fill the reactor well 32, since the radiation dose of the upper lattice plate 7 is high.

This embodiment can thus obtain the same effect of the first embodiment. In addition, because a hole is made in the upper lattice plate 7, such wastes as pipes, etc. can be carried in the shroud 5 located in the lower part of the upper lattice plate 7 without removing the upper lattice plate 7 from the upper part of the shroud 5. In addition, because the upper lattice plate 7 is not removed, a work for fixing the plate 7 is omissible.

(Third Embodiment)

Figure 17:
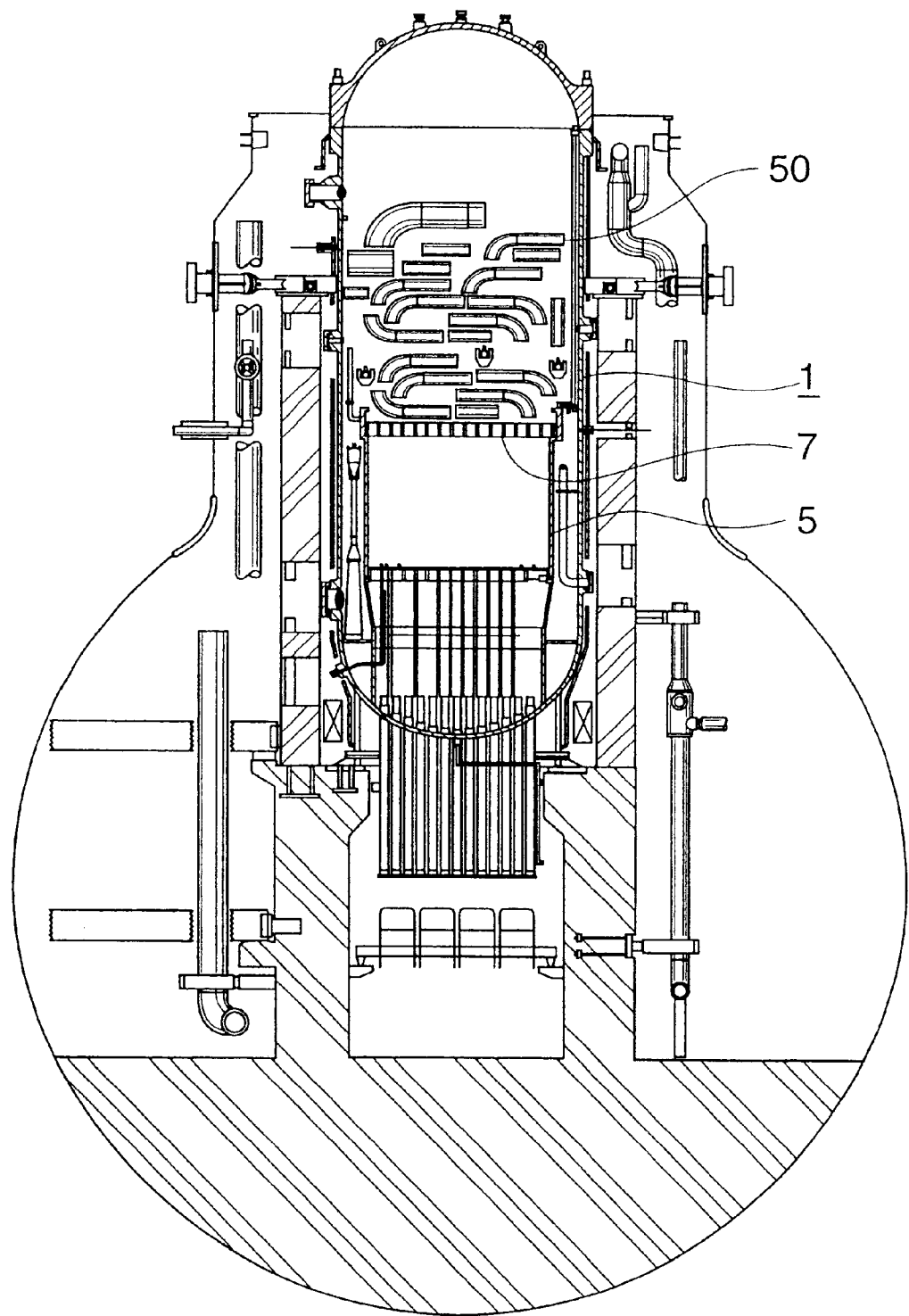
FIG. 17 shows how wastes are housed on the top surface of the upper lattice plate.

Next, a description will be made for a method for carrying out the equipment of a nuclear power plant in the third embodiment of the present invention. The method employed in this third embodiment enables cut-off and removed pipes and structures to be placed on the upper lattice plate 7 in the RPV 1. Processes in steps S5 and S103 in the first embodiment are deleted in this embodiment. In addition, steps S5 and S103 shown in FIG. 1(a) are deleted from the flowchart in this embodiment. Pipes and structures cut off and removed in step S6 are carried onto the upper side of the upper lattice plate 7 as shown in FIG. 17. Except for that steps S5 and S103 in the first embodiment are deleted from this embodiment and the destination of the items to be carried out in step S6 is different from that in the first embodiment, other items are the same as those in the first embodiment. Description for those same items will thus be omitted in this embodiment.

In step S6, pipes and structures that are cut off and removed are placed on the upper lattice plate 7. If it is expected that any of those pipes and structures placed on the upper lattice plate 7 might fall into the shroud 5, an iron plate, etc. may be placed on the upper lattice plate 7 so as to prevent such the falling.

This embodiment can thus obtain the same effect as that of the first embodiment. In addition, because the upper lattice plate 7 is not processed at all, the number of processes can be reduced. In addition, because the upper lattice plate 7 is not removed, a process for fixing the plate 7 can be omitted. Because the number of processes can be reduced, the working time can be reduced.

If all of the pipes and structures that are cut off and removed cannot be placed in the RPV 1, surplus ones may be carried out from the containment building with use of another shielded container.

(Fourth Embodiment)

Next, a description will be made for a method for carrying out the equipment of a nuclear power plant in the fourth embodiment of the present invention. According to the method in this fourth embodiment, a water sealing plug made of an elastic material is inserted in each nozzle inside the RPV 1 and the pipe connected to the plugged nozzle is cut off. After that, a closing plate is welded to the nozzle from outside the RPV 1 or by another means during a process for cutting off and carrying out pipes in step S10 in the first embodiment. Other procedures are the same as those in the first embodiment, thus the description for them will be omitted here. A balloon, which is an elastic bag made of such an elastic material as rubber or the like, is used as the water sealing plug 51.

Figure 18A:
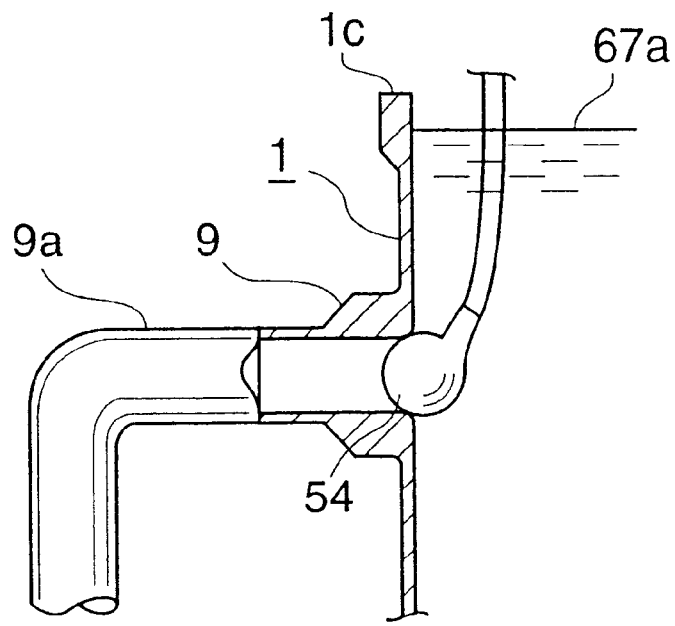
FIG. 18(a) shows how a balloon is used to seal an inlet nozzle from water.
Figure 18B:
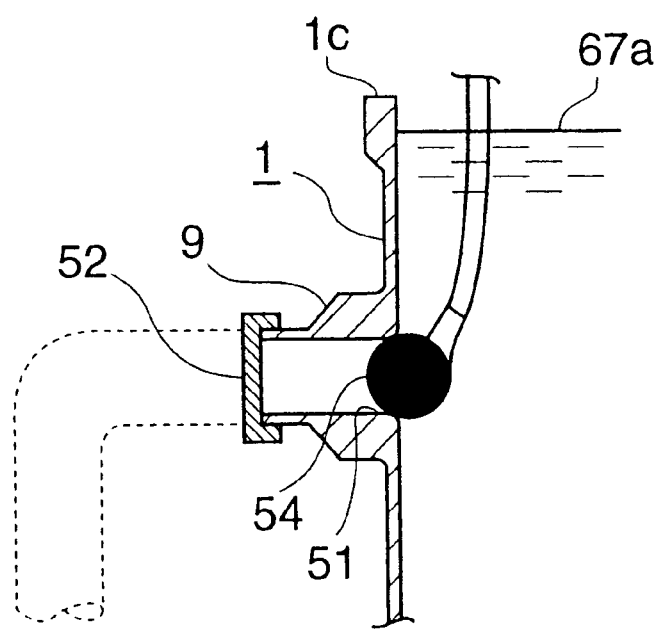
FIG. 18(b) shows how the balloon is blown up at the inlet nozzle so as to cut off the water-sealed pipe, then the nozzle is plugged.

Next, step S101 in this embodiment will be described. As shown in FIG. 18(a), the reactor water level 67a is kept in the upper part of the RPV flange 1c. Then, the balloon 54 made of an elastic material is inserted in each nozzle from inside the reactor. After that, a liquid hardening agent is fed into the balloon 54 so as to blow it up. Then, it is awaited until the fluid gardening agent is hardened. The balloon 54 functions as a water sealing plug 51 for closing the main steam nozzle 9. Next, the main steam pipe 9a connected to the main steam nozzle 9 is cut off at a joint with the main steam nozzle 9 and at a bent-down portion of the main steam pipe 9a. After the cutting, a closing plate 52 is attached to the nozzle 9 from outside the RPV 1 as shown in FIG. 18(b). After that, the cut-off pipe pieces are placed on the reactor core supporting plate 6 in the shroud 5 by inserting them through the gap between the vertically placed upper lattice plate 7 and the RPV 1.

A sealing water process is done in the same procedure as the above so as to cut off the object pipes in steps S102 to S108. This completes the process in step S10.

This embodiment can also obtain the same effect as that in the first embodiment. In addition, each object nozzle can be closed by sealing water with use of an elastic material, since the water sealing plug sticks fast to the nozzle. According to this embodiment, a pipe connected to each nozzle can be cut off and the nozzle can be plugged while the reactor water level is kept at the upper side of the opening of the nozzle when each nozzle is cut off in step S10. Consequently, the radiation dose of the workers can be reduced.

The balloon 54 may be a water-absorbent-sealed one. Air and water are fed into the balloon so as to harden the balloon. In addition, the balloon 54 may have a gas check-valve (ex., air, nitrogen gas) and a gas or a gas and low density mortar are fed into the balloon so as to blow up the balloon.

According to each embodiment described above, the method for carrying out the equipment from a containment building can shorten the working time for carrying out the RPV from the containment building and reduce the number of casks used for the work.

Furthermore, because pipes and structures connected to an RPV are carried out together with the RPV from the containment building, it is possible to shorten the time for removing those pipes and structures. In addition, because the RPV to be carried out is also used as a container for carrying out those pipes and structures, it is possible to reduce the number of containers required to carry out those pipes and structures from the containment building, as well as to reduce the working time for placing those pipes and structures in the container and inspecting its surface contamination. In addition, because the number of containers is reduced, both time and space for transporting storage containers to a storage can be reduced. Consequently, it is possible to reduce the working period for replacing the RPV, as well as to reduce the shut-down period of the object nuclear power plant related to the RPV replacement work. It is also possible to reduce the costs for transporting and storing wastes of pipes and structures after they are cut off and removed.

Although the present invention applies to a work for carrying out an RPV in an RPV replacement work in each of the above embodiments, the present invention may also apply to a work for carrying out large equipment (including the RPV) exposed in a nuclear power plant to be disused.

Although each of the above embodiments applies to the replacement of a BWR including an RPV, the embodiments may also apply to the replacement of a reactor pressure vessel of a PWR and/or the replacement of a steam generator of the PWR.

What is claimed is:

1. A method for carrying out a nuclear reactor vessel, comprising:
   removing piping connected to said nuclear reactor vessel which is disposed in a building containing a nuclear reactor in air;
   inserting said piping into water present in an inner portion of said nuclear reactor vessel;
   draining said water; and
   carrying said nuclear reactor vessel in which said piping is received in an inner portion out of said building.

2. A method according to claim 1, further comprising storing said nuclear reactor vessel at a storage location, after being carried out from said building.

3. A method according to claim 1, further comprising covering said nuclear reactor vessel with a radioactive shield when said nuclear reactor vessel is carried out from said building.

4. A method according to claim 3, further comprising setting an upper lattice plate vertically in a reactor core shroud surrounding said reactor core in said nuclear reactor vessel, said upper lattice plate being used to hold an upper part of a fuel assembly loaded in said reactor core; and carrying said removed piping into said reactor core shroud through a gap between said upper lattice plate and said reactor core shroud.

5. A method according to claim 4, wherein said upper lattice plate is removed from said reactor core shroud surrounding said reactor core in said nuclear reactor vessel and carried out from said nuclear reactor vessel, said removed piping being carried into said reactor core shroud, said upper lattice plate being returned again to said reactor core shroud after a predetermined quantity of said piping is carried in, then another removed structure is placed on said upper lattice plate.

6. A method according to claim 1, further comprising plugging a joint between said nuclear reactor vessel and said piping while filling up reactor water to a position above said joint of said piping with said nuclear reactor vessel;

cutting off said piping outside said nuclear reactor vessel; and closing said cut-off portion of said piping with a closing member.

7. A method according to claim 1, wherein a reactor water level in said nuclear reactor vessel is lowered to a position below a joint of said piping with said nuclear reactor vessel, and cutting off said piping outside a reactor shield surrounding said nuclear reactor vessel;

inserting a sealing member in said piping from said cut-off portion, thereby sealing said joint;

raising said reactor water level to a position above said joint;

cutting off said piping inside said shield of said reactor and outside said nuclear reactor vessel; and attaching a closing member to said cut-off portion of said piping.

8. A method for carrying out the equipment of a nuclear power plant according to claim 1;

wherein a pipe between an inlet mixer and said reactor pressure vessel is closed while said reactor water level is above a jet pump in said reactor pressure vessel and said inlet mixer is removed from said jet pump; and a closing member is attached to said portion of a recirculation system pipe cut off outside said reactor pressure vessel from outside of said reactor pressure vessel.

9. A method for carrying out the equipment of a nuclear power plant according to claim 6; wherein a fluid hardening agent is injected in an elastic bag inserted in a joint between said reactor pressure vessel and said pipe, thereby blowing up said elastic bag so as to close said joint.

10. A method for carrying out the equipment of a nuclear power plant according to claim 6; wherein water is injected in an elastic bag in which water absorbent is filled, said elastic bag being inserted in a joint between said reactor pressure vessel and said pipe, thereby blowing up said elastic bag so as to close said joint.

11. A method for carrying out the equipment of a nuclear power plant according to claim 6; wherein a gas or a mixture of a gas and low density mortar is injected in an elastic bag provided with a check-valve, said elastic bag being inserted in a joint between said reactor pressure vessel and said pipe, thereby blowing up said elastic bag so as to plug said joint.

12. A method for carrying out a nuclear reactor vessel, comprising:

removing piping connected to said nuclear reactor vessel which is disposed in a building containing a nuclear reactor in air;

inserting said piping into said nuclear reactor vessel for draining water; and carrying said nuclear reactor vessel in which said piping is received in said inner portion out of said building.

13. A method for carrying out a nuclear reactor vessel, comprising:

placing outside piping of a nuclear power plant in an inner space of said nuclear reactor vessel which contains water; and carrying out said nuclear reactor vessel together with said removed piping placed therein out of a building in which said nuclear reactor vessel has been disposed in air.

14. A method for carrying out a nuclear reactor vessel, comprising:

securing a space for receiving outside piping connected to said nuclear reactor vessel by taking out inner portion structures from said nuclear reactor vessel which is provided in a building;

removing said piping from said nuclear reactor vessel in air;

receiving said removed piping in water existing in said space in said nuclear reactor vessel; and carrying out said nuclear reactor vessel in which said piping is received out of said building.

15. A method according to claim 14, wherein:

said piping is operatively connected to said nuclear reactor vessel.

16. A method according to claim 14, further comprising:

covering said nuclear reactor vessel with a radioactive ray shield body before carrying out said nuclear reactor vessel from said building.

17. A method according to claim 16, wherein:

said piping is operatively connected to said nuclear reactor vessel.

18. A method according to claim 14, further comprising:

setting vertically, in a reactor core shroud in said nuclear reactor vessel, an upper portion lattice plate for holding an upper end portion of a fuel assembly body which is loaded to said reactor core; and through a gap between said upper portion lattice plate and said reactor core shroud, receiving said removed pipings in said reactor core shroud.

19. A method according to claim 14, further comprising:

carrying out said upper portion lattice plate outside said nuclear reactor vessel by taking off said upper portion lattice plate from said reactor core shroud in said nuclear reactor vessel;

receiving said removed piping in said reactor core shroud;

after a predetermined quantity of said piping has been received, installing said upper portion lattice plate in said reactor core shroud; and mounting removed other outside structures on said upper portion lattice plate.

20. A method according to claim 17, further comprising:

under a condition where reactor water in said nuclear reactor vessel is filled up to a position above a connection portion, plugging a connection portion between said reactor pressure vessel and said piping;

cutting off said piping outside said nuclear reactor vessel; and closing said cut-off portion by a closing member.

21. A method according to claim 17, further comprising:

under a condition where a water level of reactor water in said nuclear reactor vessel is lowered to a position below a connection portion of said piping, cutting off said piping outside a reactor shield body for surrounding said nuclear reactor vessel;

inserting a sealing member to said piping from said cut-off portion;

sealing said cut-off portion;

raising said water level of said reactor core to a position above said connection portion;

cutting off said piping a position of an inside of said reactor shield body and of an outside of said nuclear reactor vessel; and installing a closing member at said cut-off portion.

22. A method according to claim 17, further comprising:

under a condition where a water level of the reactor water is positioned above from a jet pump in said nuclear reactor vessel and where an inlet mixer of said jet pump is removed, shielding piping between said inlet mixer and said nuclear reactor vessel; and outside of said nuclear reactor vessel, at a portion in which a re-circulation system piping is cut off, installing a closing member from outside said nuclear reactor vessel.

23. A method according to claim 20, further comprising:

injecting a fluidization hardening agent into an elastic bag which is inserted to a connection portion between said nuclear reactor vessel and said piping;

expanding said elastic bag; and shielding said connection portion.

24. A method according to claim 20, further comprising:

injecting water into a elastic bag in which water absorption agent is filled up, inserting said elastic bag to a connection portion between said nuclear reactor vessel and said piping;

expanding said elastic bag; and shielding said connection portion.

25. A method according to claim 20, further comprising:

injecting a gas or a mixture of a gas and a low density mortar into an elastic bag provided with a gaseous check valve which is inserted to a connection portion between said nuclear reactor vessel and said piping, expanding said elastic bag; and shielding said connection portion.

26. A method according to claim 14, wherein:

at least one of a bulk head plate, a fuel exchange bellows, and PCV stabilizer are also removed.

27. A method for carrying out a steam generator, comprising:

securing a space for receiving piping existing outside a steam generator by taking out inner portion structures from said steam generator which is provided in a building;

removing said piping in air;

receiving said removed piping in water existing in said space in said steam generator; and carrying out said steam generator in which said piping is received from said building.

28. A method according to claim 27, further comprising:

after said steam generator has been carried out from said building, storing said steam generator.

* * * * *